United States Patent
Inadachi et al.

(10) Patent No.: US 7,404,646 B2
(45) Date of Patent: Jul. 29, 2008

(54) PROJECTION LENS APPARATUS AND REAR PROJECTION TYPE IMAGE DISPLAY APPARATUS

(75) Inventors: Yuriko Inadachi, Yokohama (JP); Shuji Kato, Yokohama (JP); Hidehiro Ikeda, Yokohama (JP); Naoyuki Ogura, Machida (JP); Koji Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 268 days.

(21) Appl. No.: 11/060,251

(22) Filed: Feb. 18, 2005

(65) Prior Publication Data

US 2005/0259228 A1    Nov. 24, 2005

(30) Foreign Application Priority Data

May 18, 2004    (JP) ............... 2004-147125

(51) Int. Cl.
 G03B 21/20   (2006.01)
 G03B 9/00    (2006.01)
(52) U.S. Cl. ............... 353/102; 359/649
(58) Field of Classification Search ......... 359/362, 359/756, 757, 759, 761, 649; 353/74, 94, 353/102
See application file for complete search history.

(56) References Cited

U.S. PATENT DOCUMENTS

| | | | | |
|---|---|---|---|---|
| 5,808,804 A | * | 9/1998 | Moskovich | 359/649 |
| 5,870,234 A | * | 2/1999 | Ebbesmeier nee Schitthof | 359/752 |
| 5,946,142 A | * | 8/1999 | Hirata et al. | 359/649 |
| 6,445,512 B1 | * | 9/2002 | Moskovich | 359/757 |

FOREIGN PATENT DOCUMENTS

| | | |
|---|---|---|
| JP | 9-90219 | 4/1997 |
| JP | 9-159914 | 6/1997 |
| JP | 11-344668 | 12/1999 |

* cited by examiner

*Primary Examiner*—Rodney E Fuller
(74) *Attorney, Agent, or Firm*—Antonelli, Terry, Stout & Kraus, LLP.

(57) ABSTRACT

A projection lens apparatus includes a plurality of lenses, for enlarging and projecting, onto a screen, an original image displayed on an image generation source. The plurality of lenses are arranged, beginning with the lens nearest the screen, as first to sixth lens groups. The fourth lens group includes one meniscus lens that has a positive refracting power and has a concave lens surface directed toward the screen. The concave lens surface of the meniscus lens included in the fourth group lens has a curvature in the vicinity of an outer portion of the concave lens surface that is smaller than a curvature in a predetermined area of the concave lens surface defined between a light axis of the concave lens surface of the meniscus lens and the smaller curvature of the concave lens surface in the vicinity of the outer portion of the concave lens surface.

13 Claims, 10 Drawing Sheets

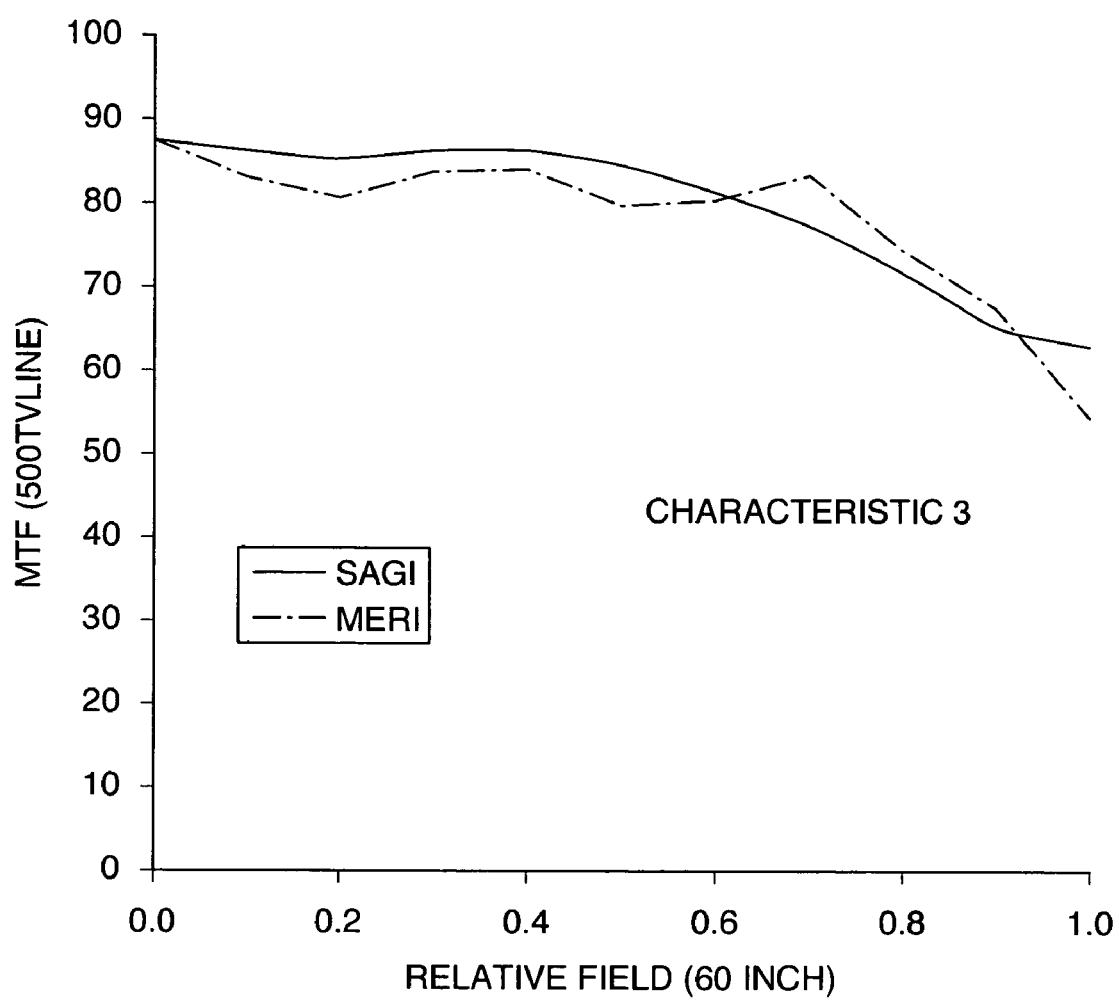

PROJECTION LENS APPARATUS AND REAR PROJECTION TYPE IMAGE DISPLAY APPARATUS

INCORPORATION BY REFERENCE

The present application claims priority from Japanese application JP 2004-147125 filed on May 18, 2004, the content of which is hereby incorporated by reference into this application.

BACKGROUND OF THE INVENTION

1. Field of the Invention

The present invention relates to a projection lens apparatus that enlarges and projects an image on a projection tube corresponding to an image generation source, and a rear projection type image display apparatus that employs this projection lens apparatus.

2. Description of the Related Art

A so-called six-lens structure, which employs one glass lens (hereinafter called a power lens) that has the highest refracting power and five plastic lenses having aspherical surfaces, is known as a projection lens apparatus that is employed for a rear projection type image display apparatus. A conventional projection lens apparatus using this six-lens structure is already known, as in, for example, JP-A-9-159914, JP-A-9-90219 and JP-A-11-344668.

SUMMARY OF THE INVENTION

As is described above, all the projection lens apparatuses employ, as a power lens, a spherical glass lens, such as a product named SK5 (a refractive index of about 1.59 and an Abbe number of 61.3) by SCHOTT, that has high dispersion and a low refractive index. Since such a glass lens having high dispersion and a low refractive index is less expensive than a glass lens having low dispersion and a high refractive index, a projection lens apparatus can be manufactured at a low cost. However, when a spherical glass lens having high dispersion and a low refractive index is employed, not only it is difficult to obtain a desired refracting power, but also the number of aberrations generated is increased. Therefore, when a glass lens having low dispersion and a high refractive index is employed, as described in JP-A-9-159914, JP-A-9-90219 and JP-A-11-344668 described above, five aspherical plastic lenses are employed to increase the number of aspherical lens surfaces, so that aberrations can be satisfactorily corrected.

However, according to the projection lens apparatuses described in JP-A-9-159914, JP-A-9-90219 and JP-A-11-344668, to obtain a short focal distance and to obtain a desired aberration correction function, a plastic lens (a fourth lens) for aberration correction is located very near a power lens on the image generation source side. Therefore, when lenses are assembled in a lens barrel, the power lens and the plastic lens physically interfere with each other, so that assembly efficiency is deteriorated and productivity is reduced. According to the projection lens apparatus described in JP-A-9-159914, since the outer edge of the fourth lens projects outward to the power lens, physical interference between the outer edge of the lens and the power lens more easily occurs. Further, according to the projection lens apparatuses described in JP-A-9-90219 and JP-A-11-344668, as is apparent from the description of the lens data, the inter-plane distance between the power lens and the fourth lens in the vicinity of the light axis is equal to or less than 1 mm, and the fourth lens is convex, as a whole, relative to the power lens, so that physical interference between the two occurs more easily in the vicinity of the light axis.

As is described above, for a six-lens structure employing one power lens and five plastic lenses, it is important that production efficiency be improved by preventing physical interference between the lenses from occurring, especially during the assembly process.

Improved contrast is also desired for a projection lens apparatus. Generally, the aberration correction capability of a projection lens is regarded as a more important lens attribute for a projection lens apparatus. However, for the image quality of a rear projection type image display apparatus, an improvement in contrast that represents the black-and-white ratio of an image is an important element for determining the superiority of the lens performance. In order to improve the contrast, a meniscus lens must be arranged at a position that provides the longest inter-plane distance as possible between the image display face of the projection tube, which is an image generation source, and the emittance plane of the meniscus lens, whereat a concave face is directed toward a screen located nearest the image generation source, and a larger divergence angle must be obtained for light reflected by the emittance plane of the meniscus lens, so that light (unnecessary light) reflected by the individual lenses in the projection lens apparatus will not return to the original image. However, when the meniscus lens is arranged so as to obtain as long an inter-plane distance from the image display face as possible, a plurality of light beams overlap and enter from the projection tube at different incidence angles within the same lens range. Therefore, satisfactory aberration correction is difficult, and a better aberration correction capability is required. However, further improvement of the correction capability and of contrast are difficult with the structures disclosed in JP-A-9-159914, JP-A-9-90219 and JP-A-11-344668.

The present invention is provided while taking the above problems into account, and a first objective of this invention is the provision of a technique for enhancing the attributes of a projection lens apparatus for a rear type image display apparatus.

A second objective of the invention is the provision of a technique, for a projection lens apparatus for a rear projection type image display apparatus, that can suppress a reduction in contrast due to light reflected by lenses.

To achieve the first objective, the present invention is characterized in that: a meniscus lens having a concave face directed toward a screen and having a negative refracting power is employed as an aberration correction lens that is arranged near a power lens on an image generation source side; and the lens face of the meniscus lens near the screen is an aspherical surface, so that curvature is increased from a light axis of the lens face to a predetermined point located between the light axis and an outer edge, or is reduced from the predetermined point to the outer edge. That is, in this invention, the curvature in the vicinity of the outer edge of the lens face of the meniscus lens near the screen is smaller than the curvature in a predetermined defined area extending from the light axis of the meniscus lens to the outer edge.

According to the arrangement of the invention, the meniscus lens face directed toward the screen is recessed, and the curvature at the outer edge of the lens face directed toward the screen is small (i.e., the lens face near the screen is not shaped as though the lens is projected toward the screen, but is shaped as though the lens is being returned to the image generation source). Therefore, physical interference between the power lens and the meniscus lens seldom occurs at both the center portion and the outer edge, including the light axis. Further, since the meniscus lens of the invention has the above described shape, the optical action is strengthened that directs, inwardly (the lens light axial direction), image light that has been emitted by the image generation source and has passed through the outer edge. Therefore, the meniscus lens can be arranged at a distance from the power lens. When the meniscus lens and the power lens are arranged at a distance, the incidence angle of the image light relative to the incident plane of the power lens can still be reduced, and aberration correction can be appropriately performed. Further, since the optical function for directing the image light in the inward direction is strengthened, the diameter of the power lens can also be reduced.

Furthermore, in this invention, inexpensive optical glass having a low refractive index is employed as a power lens, and the same plastic lens materials as those used for the other lenses [for example, PMMA (a refractive index of 1.49 and an Abbe number of 58), CR-39 (a refractive index of 1.50 and an Abbe number of 58) or TPX (a refractive index of 1.466 and an Abbe number of 61)] are employed for meniscus lenses, for aberration correction, that are arranged following the power lens. With this arrangement, an aspherical shape having a more complicated fourteenth-order or higher can be formed, the space of the aspherical plane on the periphery is increased, and light entering the power lens is efficiently corrected, so that a satisfactory aberration correction capability can be maintained and a cost reduction can be obtained.

In addition, according to this invention, a lens, the peripheral portion of which has a locally positive power, is employed as a lens near the power lens on the screen side, and a function for the convergence of a light beam passing through the peripheral portion is provided for this lens. With this arrangement, the convergence action performed at the emittance plane of the power lens is shared, and the aberration is reduced. Therefore, a large area of the aspherical plane of the peripheral portion need only be increased, and two inflection points provided, for the aberration on the periphery of the screen to be appropriately corrected.

To achieve the second objective, the invention is characterized in that: when $f_6$ denotes a focal distance for negative lenses, including a concave meniscus lens that is located nearest the image generation source, and d denotes a distance between the emittance plane of the concave meniscus lens and the fluorescent glass face of the image generation source, a relation $$-7.62 < f_6/d < -5.86$$

is established. According to this arrangement, since the light path along which light is reflected by the emittance plane of the concave meniscus lens and is returned to the image generation source can be adjusted, the reflected light can be scattered and the light intensity for the dimension reduced. Therefore, according to the invention, a reduction in the contrast, which is caused by the light that is reflected by the emittance plane of the concave meniscus lens and is returned to the fluorescent face of the image generation source, can be suppressed.

According to the present invention, productivity can be improved and costs can be reduced. Moreover, deterioration of the contrast can be suppressed and a high quality image can be obtained.

Other objects, features and advantages of the invention will become apparent from the following description of the embodiments of the invention taken in conjunction with the accompanying drawings.

BRIEF DESCRIPTION OF THE DRAWINGS

FIG. 11 is an MTF characteristic graph for the projection lens apparatus in Table 3 shown as the embodiment of the present invention.

DETAILED DESCRIPTION OF THE PREFERRED EMBODIMENT

Figure 1:
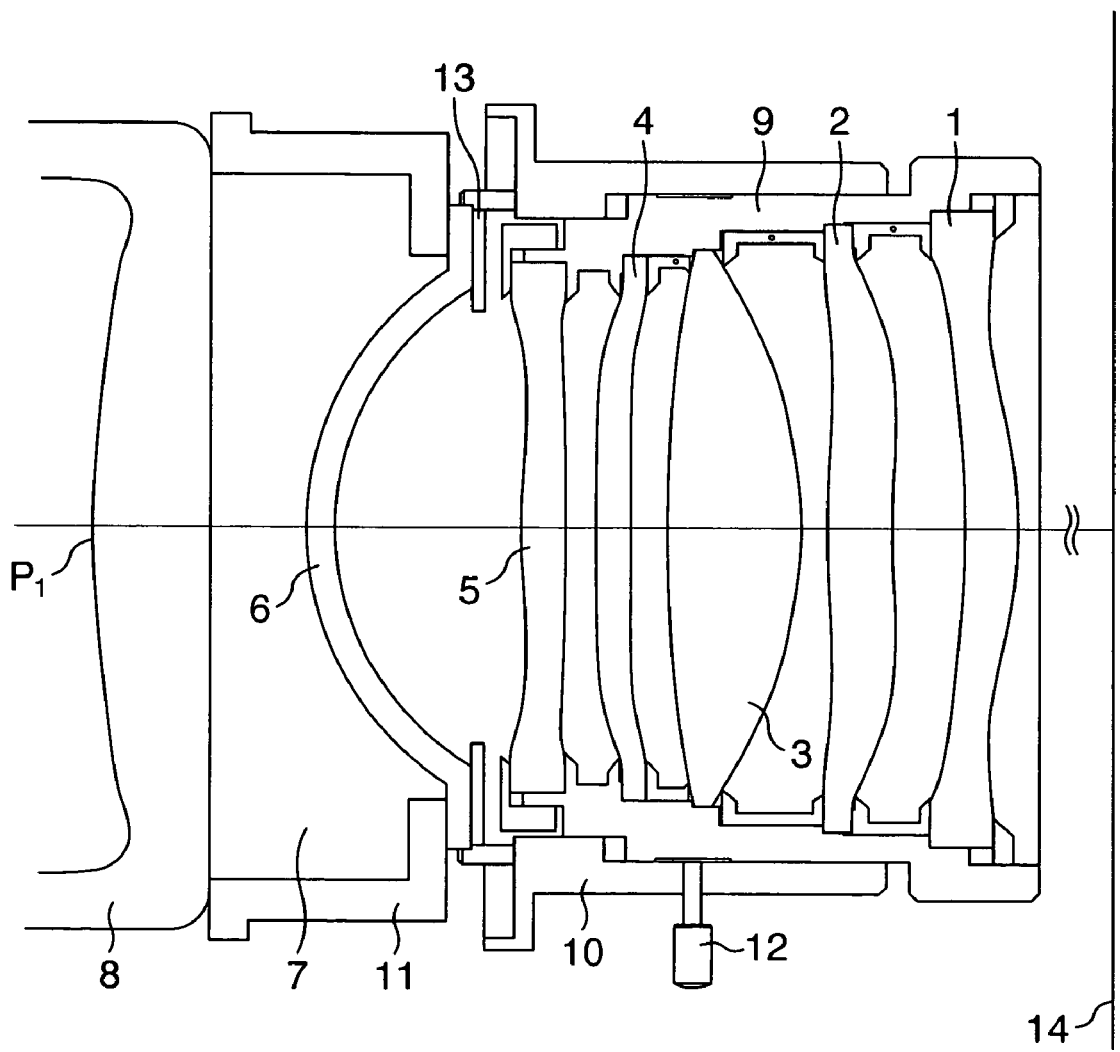
FIG. 1 is a cross-sectional view of a projection lens apparatus according to one embodiment of the present invention.

The preferred embodiment of the present invention will now be described while referring to the drawings. It should be noted that the same reference numbers are provided for sections used in common for the drawings.

FIG. 1 is a cross-sectional view of the essential lens portion of a projection lens apparatus according to one embodiment of the invention. A first group lens 1, a second group lens 2, a third group lens 3, a fourth group lens 4 and a fifth group lens 5 are assembled in an inner lens barrel 9, and are secured to an outer lens barrel 10 by a fixing screw 12. Furthermore, the outer lens barrel 10 is fixed to a bracket 11 through a fixing plate 13 by using a screw (not shown). Then, an image on a fluorescent plane $P_1$ of a projection tube, which is an object plane, is enlarged by the lens groups and is projected onto a rear projection screen 14. In the embodiment of the invention, the focal distance of a sixth group lens 6 is calculated that includes a projection tube panel 8, a coolant 7 and the projection tube fluorescent plane $P_1$.

Figure 2:
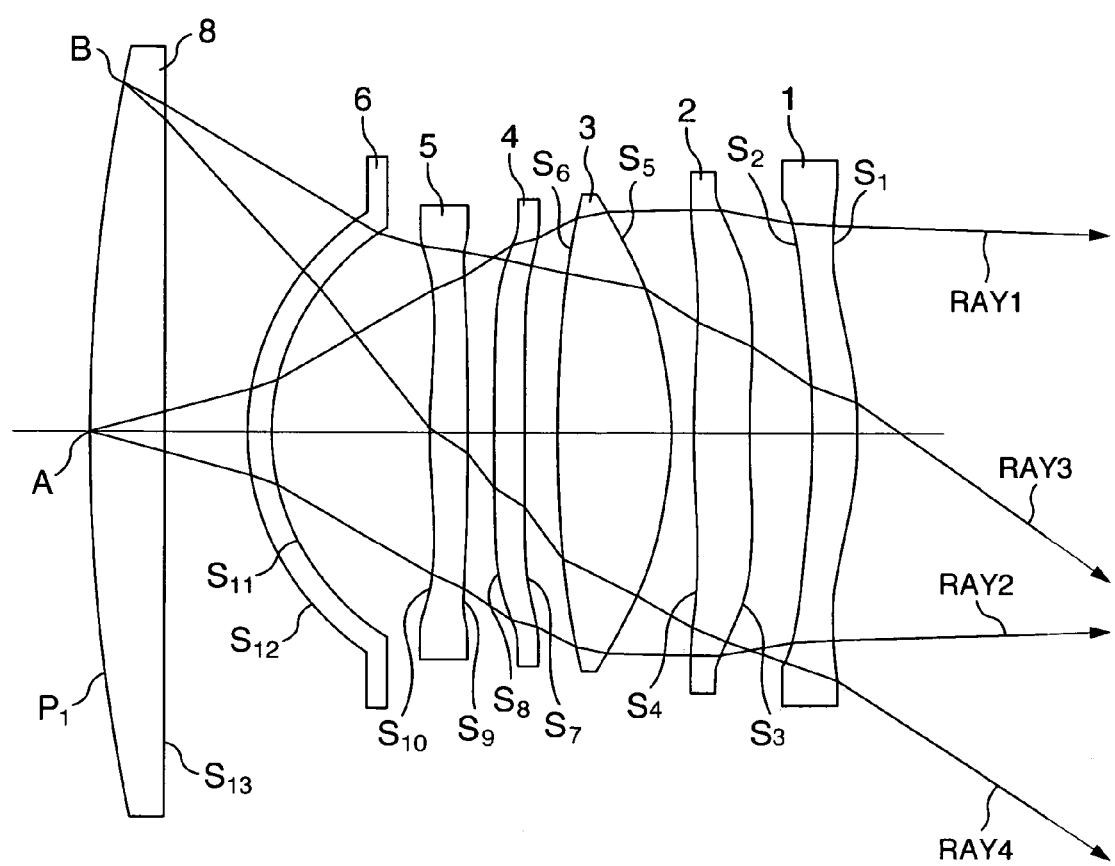
FIG. 2 is a cross-sectional view of the projection lens apparatus according to the embodiment of the invention.
Figure 3:
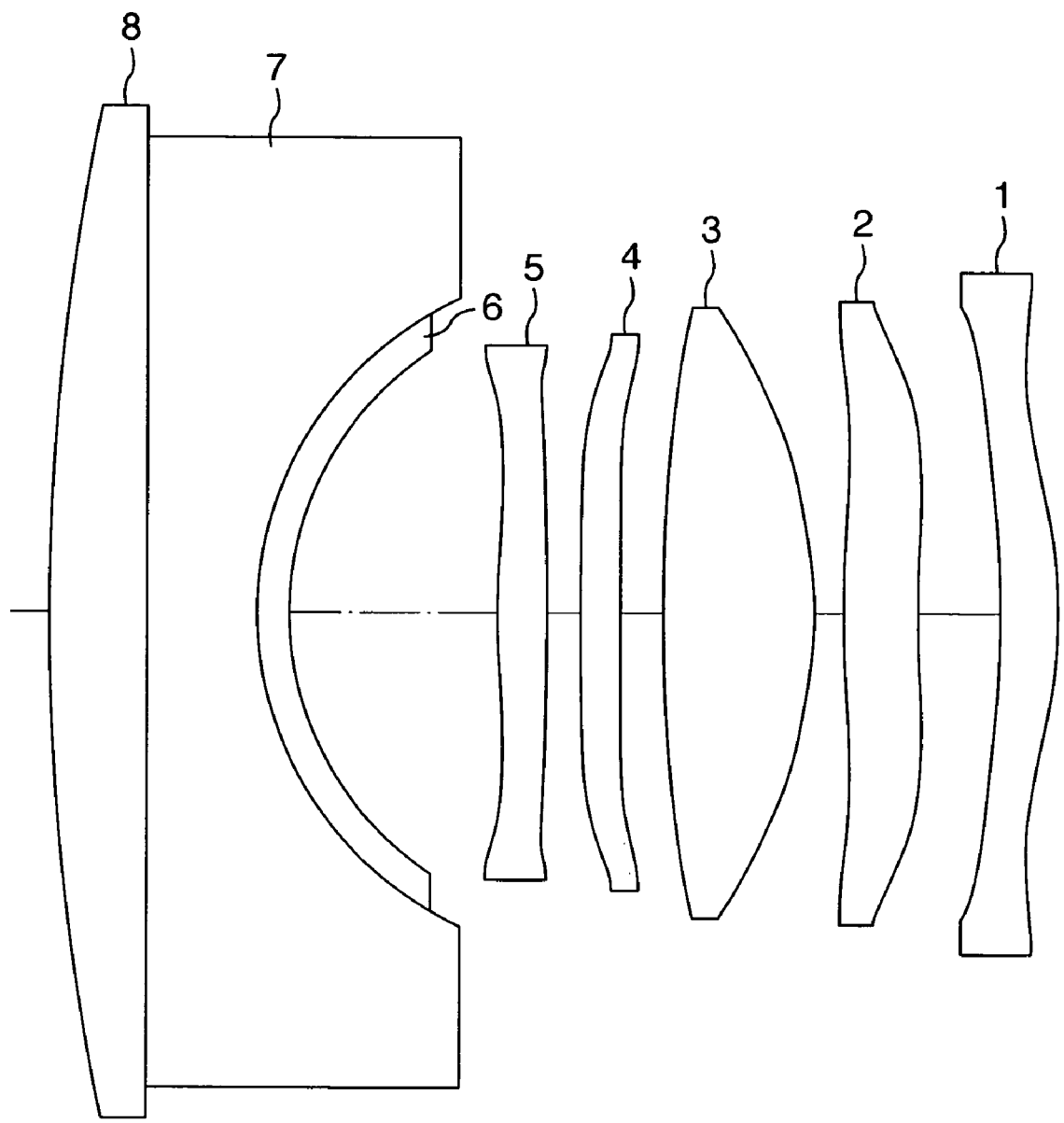
FIG. 3 is a cross-sectional view of the projection lens apparatus according to the embodiment of the invention.
Figure 4:
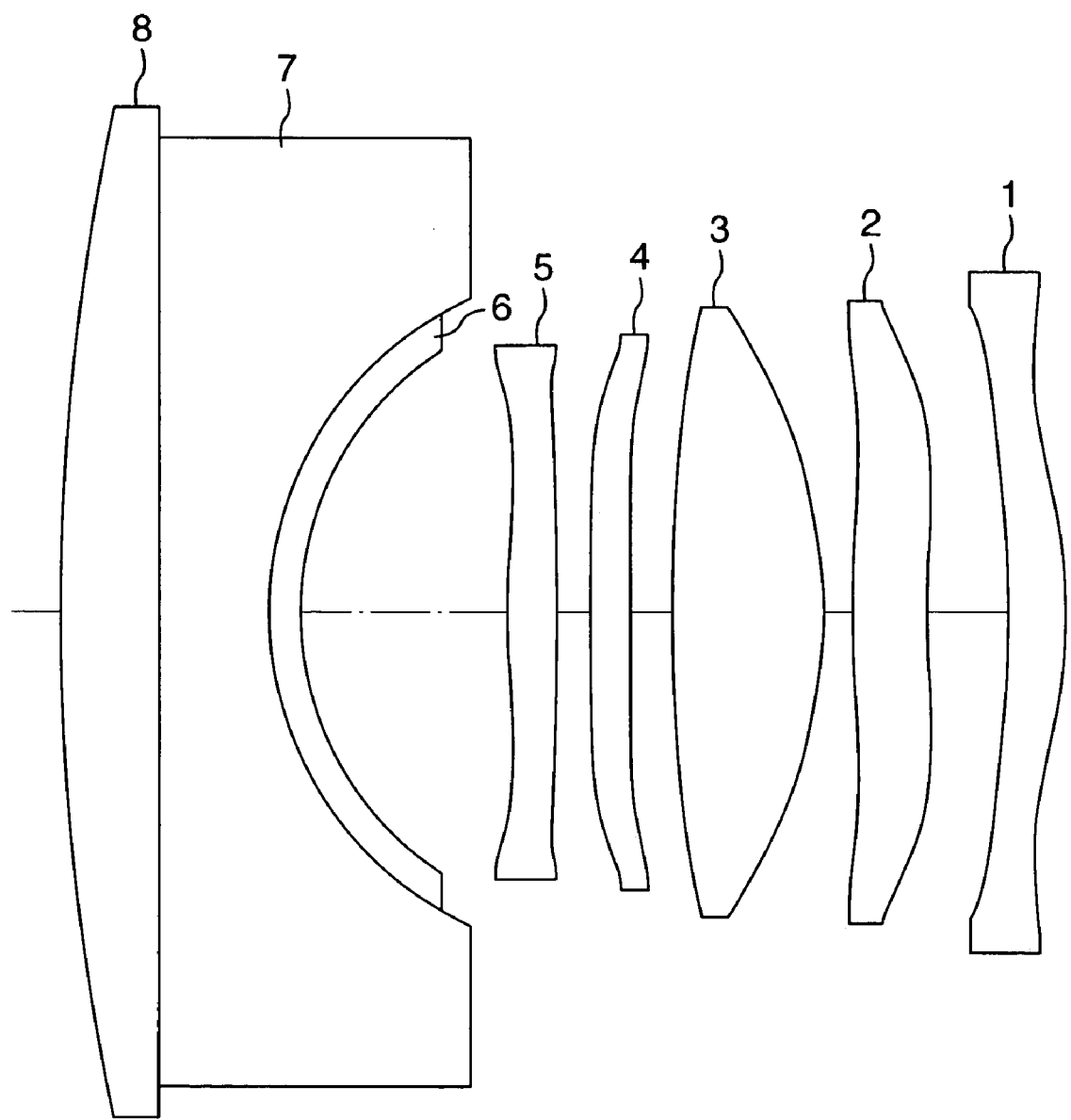
FIG. 4 is a cross-sectional view of the projection lens apparatus according to the embodiment of the invention.

FIG. 2 is a diagram showing the structure of the projection lens apparatus for the embodiment of the invention and the results obtained by tracking light beams, while specific lens data are shown in Table 1. FIGS. 3 and 4 are diagrams showing other example structures for the projection lens apparatus according to a first embodiment, while specific lens data are shown in Tables 2 and 3. For the sake of convenience, the lens barrels and other components are not included in the structures shown for the projection lens apparatus in FIGS. 2 to 4.

The projection lens apparatus for the embodiment of the invention is designed so that the best performance is provided when a 5.2 inch raster image is displayed on the projection tube fluorescent plane $P_1$, and an enlarged, 60 inch image of this raster image is projected onto the screen while a large viewing angle is obtained.

Figure 5:
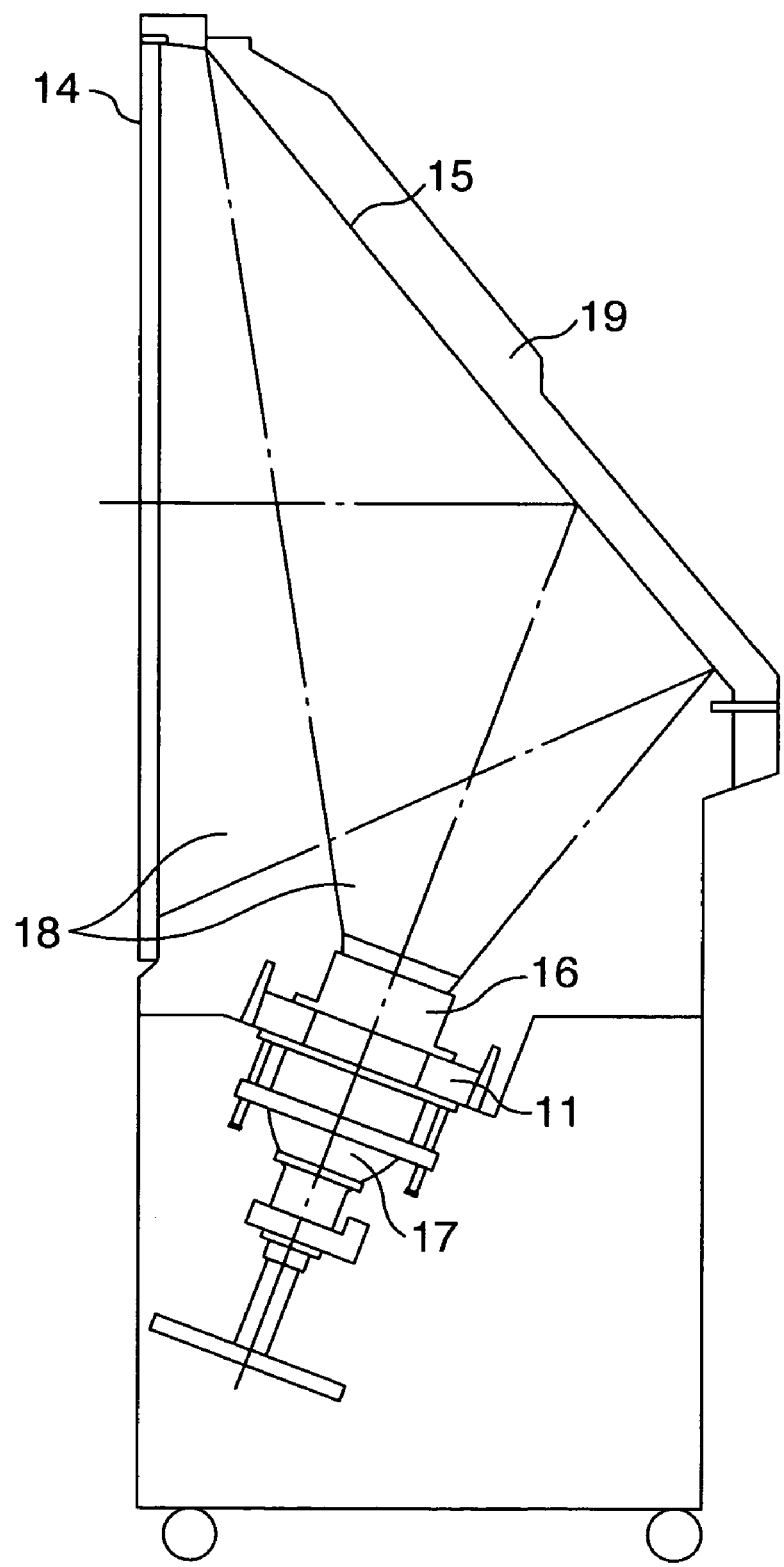
FIG. 5 is a vertical cross-sectional view of the essential portion of a rear projection type image display apparatus employed as a projection image apparatus.

An explanation will now be given while referring to FIG. 5, in which is shown an example rear projection image display apparatus that employs the projection lens apparatus described above. In FIG. 5, a projection lens apparatus 16 is integrally formed with a bracket 11 and a projection tube 17, which is a light source, and an image light flux 1, emitted by the projection lens apparatus 16, is reflected by an optical path return mirror 15 and the reflected light reaches the rear projection screen 14 and projects an image. In this manner, a set having a satisfactorily small size can be provided for a projection television set employing a single return mirror 15. The projection lens apparatus 16, the bracket 11 and the projection tube 17 are accommodated inside a housing 19.

Specific lens data available for the projection lens apparatus for this invention are shown in Tables 1 to 20.

TABLE 1

$f = 85.2431$ mm   $Fno = 1.00$

| Constituent Lens | Lens Surface | Curvature Radius Rd | Inter-plane Distance TH | Abbe Number vd | Refractive Index nd |
|---|---|---|---|---|---|
| Screen | — | INFINITY | 1034 | — | 1 |
| First Lens | $S_1$ | 72.26774 | 8 | 57.9 | 1.4924 |
|  | $S_2$ | 154.76315 | 11.17 |  | 1 |
| Second Lens | $S_3$ | −205 | 10 | 57.9 | 1.4924 |
|  | $S_4$ | −204.9 | 4 |  | 1 |
| Third Lens | $S_5$ | 80.53 | 21.03 | 61.25 | 1.59137 |
|  | $S_6$ | −233.56 | 5.97 |  | 1 |
| Fourth Lens | $S_7$ | −550.4033 | 5.53 | 57.9 | 1.4924 |
|  | $S_8$ | −10000 | 4.9 |  | 1 |
| Fifth Lens | $S_9$ | 10000 | 6.48 | 57.9 | 1.4924 |
|  | $S_{10}$ | −163.30263 | 28.61 |  | 1 |
| Sixth Lens | $S_{11}$ | −45.89062 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | −0.34880 | −1.9342E−06 | −7.3136E−10 | −1.2128E−12 | 1.50525E−15 | −5.4068E−19 | 6.62089E−23 |
|  | $S_2$ | −1.21802 | −6.9734E−07 | −1.3867E−09 | 2.20925E−12 | −1.3771E−15 | 4.63225E−19 | −6.3905E−23 |
| Second Lens | $S_3$ | 14.00310 | 3.1296E−06 | 5.32029E−12 | 2.10567E−12 | −2.436E−15 | 1.04627E−18 | −1.7659E−22 |
|  | $S_4$ | −224.19638 | −3.5915E−07 | 3.5795E−09 | −3.6868E−12 | 1.99089E−15 | −5.7994E−19 | 6.06658E−23 |
| Fourth Lens | $S_7$ | −1290.69648 | 1.04374E−06 | −3.3257E−09 | 1.67551E−12 | −3.572E−16 | −1.4093E−20 | 6.05223E−23 |
|  | $S_8$ | −4141.83503 | 1.60899E−06 | −7.8532E−09 | 4.43341E−12 | 8.94608E−16 | −1.698E−18 | 5.03757E−22 |
| Fifth Lens | $S_9$ | 2719.03581 | 1.89917E−06 | −2.7049E−09 | 3.07617E−13 | 3.02612E−15 | −2.5772E−18 | 5.21531E−22 |
|  | $S_{10}$ | 13.01617 | 3.75419E−06 | −1.118E−09 | 4.52128E−12 | −4.7992E−15 | 2.4137E−18 | −6.276E−22 |
| Sixth Lens | $S_{11}$ | 0.32911 | −1.3675E−06 | 6.49789E−09 | −1.2915E−11 | 1.50647E−14 | −8.666E−18 | 2.08854E−21 |
|  | — | — | — | — | — | — | — | — |

TABLE 2

$f = 85.3584$ mm   $Fno = 0.99$

| Constituent Lens | Lens Surface | Curvature Radius Rd | Inter-plane Distance TH | Abbe Number vd | Refractive Index nd |
|---|---|---|---|---|---|
| Screen | — | INFINITY | 1033 | — | 1 |
| First Lens |  | 70.36068695 | 8 | 57.9 | 1.4924 |
|  | $S_1$ | 134.4683475 | 12.358199 |  | 1 |
| Second Lens | $S_2$ | −205 | 10 | 57.9 | 1.4924 |
|  | $S_3$ | −204.9 | 4 |  | 1 |
| Third Lens | $S_4$ | 71.51 | 21.6988189 | 61.25 | 1.59137 |
|  | $S_5$ | −351.82 | 5.32443378 |  | 1 |
| Fourth Lens | $S_6$ | −477.8425195 | 5.5 | 57.9 | 1.4924 |
|  | $S_7$ | −4326.165663 | 4.6397258 |  | 1 |
| Fifth Lens | $S_8$ | 10000 | 6.46370629 | 57.9 | 1.4924 |
|  | $S_9$ | −152.2737679 | 28.8151162 |  | 1 |
| Sixth Lens | $S_{10}$ | −46.1437686 | 4.5 | 57.9 | 1.4924 |
|  | $S_{11}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

TABLE 2-continued

| Constituent Lens | Lens Surface | Aspherical Surface Coefficient | | | | | | |
|---|---|---|---|---|---|---|---|---|
| | | K | A | B | C | D | E | F |
| First Lens | S$_1$ | 0.62875 | −2.0076E−06 | −1.5069E−09 | −1.5174E−13 | 6.52351E−16 | −2.2412E−19 | 2.0552E−23 |
| | S$_2$ | 1.70005 | −7.059E−07 | −2.2724E−09 | 3.38665E−12 | −2.2432E−15 | 7.78833E−19 | −1.0589E−22 |
| Second Lens | S$_3$ | 17.58688 | 3.03919E−06 | 3.51732E−10 | 1.5777E−12 | −1.9398E−15 | 8.19938E−19 | −1.3548E−22 |
| | S$_4$ | −10.99347 | 2.03524E−06 | 3.40707E−10 | −3.6979E−13 | −8.5158E−17 | 9.26841E−20 | −2.8411E−23 |
| Fourth Lens | S$_7$ | 51.24506 | 1.56574E−06 | −3.6716E−09 | 1.58995E−12 | −3.0125E−16 | 7.76115E−20 | 1.06402E−23 |
| | S$_8$ | 9919.70863 | 1.23282E−06 | −8.1211E−09 | 5.65118E−12 | −4.9563E−16 | −9.4237E−19 | 3.35744E−22 |
| Fifth Lens | S$_9$ | −481.22634 | 1.18818E−06 | −2.9742E−09 | 2.7253E−12 | 1.05838E−15 | −2.196E−18 | 6.01394E−22 |
| | S$_{10}$ | 13.30277 | 3.59821E−06 | −1.231E−09 | 6.47153E−12 | −6.2096E−15 | 2.52986E−18 | −4.8007E−22 |
| Sixth Lens | S$_{11}$ | 0.34300 | −1.4698E−06 | 8.22857E−09 | −1.6896E−11 | 1.94956E−14 | −1.1079E−17 | 2.60796E−21 |

TABLE 3 f = 85.2015 mm    Fno = 0.99

| Constituent Lens | Lens Surface | Curvature Radius Rd | Inter-plane Distance TH | Abbe Number vd | Refractive Index nd |
|---|---|---|---|---|---|
| Screen | — | INFINITY | 1033 | — | 1 |
| First Lens | S$_1$ | 71.42642 | 8.0 | 57.9 | 1.4924 |
| | S$_2$ | 137.39559 | 12.28 | | 1 |
| Second Lens | S$_3$ | −205 | 10.0 | 57.9 | 1.4924 |
| | S$_4$ | −204.9 | 1 | | 1 |
| Third Lens | S$_5$ | 71.51 | 21.51 | 61.25 | 1.59137 |
| | S$_6$ | −351.82 | 5.21 | | 1 |
| Fourth Lens | S$_7$ | −535.29030 | 5.5 | 57.9 | 1.4924 |
| | S$_8$ | −10000 | 4.80 | | 1 |
| Fifth Lens | S$_9$ | 10000 | 6.46 | 57.9 | 1.4924 |
| | S$_{10}$ | −153.41870 | 29.01 | | 1 |
| Sixth Lens | S$_{11}$ | −46.24367 | 4.5 | 57.9 | 1.4924 |
| | S$_{12}$ | −50.132 | 13.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | S$_1$ | 0.66759 | −1.9869E−06 | −1.462E−09 | −2.1173E−13 | 6.89618E−16 | −2.3471E−19 | 2.17911E−23 |
| | S$_2$ | 2.14780 | −5.9404E−07 | −2.2338E−09 | 3.32412E−12 | −2.2723E−15 | 8.1523E−19 | −1.1385E−22 |
| Second Lens | S$_3$ | 17.57562 | 3.36341E−06 | 1.26909E−10 | 1.62453E−12 | −1.9217E−15 | 8.04084E−19 | −1.3211E−22 |
| | S$_4$ | −75.68394 | 1.44211E−06 | 5.99987E−10 | −4.0494E−13 | −1.0508E−16 | 9.60397E−20 | −2.7089E−23 |
| Fourth Lens | S$_7$ | 64.00788 | 1.49746E−06 | −3.7576E−09 | 1.71441E−12 | −3.5546E−16 | 8.49707E−20 | 1.3401E−23 |
| | S$_8$ | −10000 | 1.12651E−06 | −8.0435E−09 | 5.60669E−12 | −4.7481E−16 | −9.5858E−19 | 3.43901E−22 |
| Fifth Lens | S$_9$ | 7507.31738 | 1.28716E−06 | −2.9601E−09 | 2.75989E−12 | 7.4688E−16 | −1.9347E−18 | 5.33758E−22 |
| | S$_{10}$ | 13.88740 | 3.74141E−06 | −1.3943E−09 | 6.75697E−12 | −6.6771E−15 | 2.81447E−18 | −5.339E−22 |
| Sixth Lens | S$_{11}$ | 0.35311 | −1.4593E−06 | 7.93578E−09 | −1.607E−11 | 1.84811E−14 | −1.0493E−17 | 2.47685E−21 |

TABLE 4 f = 84.4798 mm    Fno = 0.98

| Constituent Lens | Lens Surface | Curvature Radius Rd | Inter-plane Distance TH | Abbe Number vd | Refractive Index nd |
|---|---|---|---|---|---|
| Screen | — | INFINITY | 1033 | — | 1 |
| First Lens | S$_1$ | 69.88295251 | 8 | 57.9 | 1.4924 |
| | S$_2$ | 132.1562347 | 12.348748 | | 1 |
| Second Lens | S$_3$ | −205 | 10 | 57.9 | 1.4924 |
| | S$_4$ | −204.9 | 4 | | 1 |
| Third Lens | S$_5$ | 71.51 | 21.3843755 | 61.25 | 1.59137 |
| | S$_6$ | −351.82 | 6.24297822 | | 1 |
| Fourth Lens | S$_7$ | −552.206564 | 5.5 | 57.9 | 1.4924 |
| | S$_8$ | −10000 | 3.78630906 | | 1 |

TABLE 4-continued

| Constituent Lens | Lens Surface | Curvature Radius Rd | Inter-plane Distance TH | Abbe Number νd | Refractive Index nd |
|---|---|---|---|---|---|
| Fifth Lens | $S_9$ | 10000 | 6.51863793 | 57.9 | 1.4924 |
|  | $S_{10}$ | −151.1863331 | 29.0189513 |  | 1 |
| Sixth Lens | $S_{11}$ | −46.53032451 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | 0.45035 | −1.8881E−06 | −1.23E−09 | −7.2619E−13 | 1.07917E−15 | −3.6492E−19 | 3.91263E−23 |
|  | $S_2$ | 1.28769 | −4.001E−07 | −2.5229E−09 | 3.38139E−12 | −2.164E−15 | 7.4925E−19 | −1.0249E−22 |
| Second Lens | $S_3$ | 17.25393 | 3.36969E−06 | −4.6049E−10 | 2.45065E−12 | −2.4416E−15 | 9.628E−19 | −1.4903E−22 |
|  | $S_4$ | −222.68446 | 5.0986E−08 | 2.44828E−09 | −1.894E−12 | 5.81385E−16 | −6.1754E−20 | −1.2402E−23 |
| Fourth Lens | $S_7$ | 32.29954 | 1.56503E−06 | −3.8438E−09 | 2.08113E−12 | −8.5218E−16 | 3.71045E−19 | −3.8578E−23 |
|  | $S_8$ | −7778.05424 | 1.6466E−06 | −8.8219E−09 | 5.8281E−12 | 2.06623E−17 | −1.4186E−18 | 4.76651E−22 |
| Fifth Lens | $S_9$ | 9500.05252 | 1.65857E−06 | −3.3738E−09 | 3.85081E−12 | −1.5138E−15 | −1.8639E−19 | 8.6757E−23 |
|  | $S_{10}$ | 13.28193 | 4.02608E−06 | −2.3355E−09 | 1.04854E−11 | −1.2707E−14 | 6.84443E−18 | −1.508E−21 |
| Sixth Lens | $S_{11}$ | 0.38136 | −1.4671E−06 | 8.00382E−09 | −1.6312E−11 | 1.88515E−14 | −1.076E−17 | 2.55211E−21 |
|  | — | — | — | — | — | — | — | — |

TABLE 5 f = 84.3512 mm    Fno = 0.98

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.50732 | — | 1 |
| First Lens | $S_1$ | 68.84382886 | 8 | 57.9 | 1.4924 |
|  | $S_2$ | 137.2740273 | 12.8338327 |  | 1 |
| Second Lens | $S_3$ | −205 | 10 | 57.9 | 1.4924 |
|  | $S_4$ | −204.9 | 4 |  | 1 |
| Third Lens | $S_5$ | 71.51 | 21.03 | 61.25 | 1.59137 |
|  | $S_6$ | −351.82 | 6.24476074 |  | 1 |
| Fourth Lens | $S_7$ | −451.3251199 | 5.5 | 57.9 | 1.4924 |
|  | $S_8$ | −10000 | 3.68020165 |  | 1 |
| Fifth Lens | $S_9$ | 10000 | 6.5054599 | 57.9 | 1.4924 |
|  | $S_{10}$ | −151.8877208 | 28.4984275 |  | 1 |
| Sixth Lens | $S_{11}$ | −46.82470031 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 |  | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | 0.47841 | −1.858E−06 | −1.1347E−09 | −9.4162E−13 | 1.16761E−15 | −3.7447E−19 | 3.80179E−23 |
|  | $S_2$ | 1.31275 | −3.2788E−07 | −2.4963E−09 | 3.0795E−12 | −1.8815E−15 | 6.38302E−19 | −8.7147E−23 |
| Second Lens | $S_3$ | 17.30494 | 3.40637E−06 | −7.2124E−10 | 2.76392E−12 | −2.6013E−15 | 1.01221E−18 | −1.5748E−22 |
|  | $S_4$ | −261.67783 | −2.316E−07 | 2.88817E−09 | −2.3611E−12 | 8.91616E−16 | −1.6484E−19 | 3.01392E−26 |
| Fourth Lens | $S_7$ | 22.30233 | 1.57685E−06 | −3.904E−09 | 2.18928E−12 | −6.9081E−16 | 1.87784E−19 | 6.41318E−24 |
|  | $S_8$ | −10000 | 1.93777E−06 | −9.2597E−09 | 6.19601E−12 | −8.2851E−18 | −1.5095E−18 | 5.06242E−22 |
| Fifth Lens | $S_9$ | 1595.21830 | 1.92576E−06 | −3.8833E−09 | 4.00029E−12 | −1.6556E−15 | −3.0282E−20 | 2.72789E−23 |
|  | $S_{10}$ | 13.35774 | 4.13873E−06 | −2.7497E−09 | 1.08773E−11 | −1.3173E−14 | 7.16985E−18 | −1.6005E−21 |
| Sixth Lens | $S_{11}$ | 0.40103 | −1.3061E−06 | 7.44219E−09 | −1.5455E−11 | 1.82126E−14 | −1.0513E−17 | 2.51631E−21 |
|  | — | — | — | — | — | — | — | — |

TABLE 6 f = 84.1587 mm    Fno = 0.98

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.41891 | — | 1 |
| First Lens | $S_1$ | 68.38560631 | 8 | 57.9 | 1.4924 |
|  | $S_2$ | 134.181839 | 12.7471266 |  | 1 |
| Second Lens | $S_3$ | −205 | 10 | 57.9 | 1.4924 |
|  | $S_4$ | −204.9 | 4 |  | 1 |
| Third Lens | $S_5$ | 71.51 | 21.03 | 61.25 | 1.59137 |
|  | $S_6$ | −351.82 | 6.38168426 |  | 1 |
| Fourth Lens | $S_7$ | −448.6881935 | 5.5 | 57.9 | 1.4924 |
|  | $S_8$ | −10000 | 3.50338084 |  | 1 |
| Fifth Lens | $S_9$ | 10000 | 6.53911573 | 57.9 | 1.4924 |
|  | $S_{10}$ | −149.2447066 | 28.6797805 |  | 1 |
| Sixth Lens | $S_{11}$ | −47.01557467 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient |  |  |  |  |  |  |
|---|---|---|---|---|---|---|---|---|
|  |  | K | A | B | C | D | E | F |
| First Lens | $S_1$ | 0.36076 | −1.8636E−06 | −9.5941E−10 | −1.2001E−12 | 1.37029E−15 | −4.4897E−19 | 4.88443E−23 |
|  | $S_2$ | 1.01098 | −3.8759E−07 | −2.3311E−09 | 2.77757E−12 | −1.5973E−15 | 5.19061E−19 | −6.8792E−23 |
| Second Lens | $S_3$ | 16.64756 | 3.32543E−06 | −8.0621E−10 | 2.9243E−12 | −2.7156E−15 | 1.05447E−18 | −1.6395E−22 |
|  | $S_4$ | −305.68368 | −5.75E−07 | 3.55562E−09 | −3.1633E−12 | 1.43455E−15 | −3.5278E−19 | 2.69306E−23 |
| Fourth Lens | $S_7$ | 26.73778 | 1.45732E−06 | −3.6654E−09 | 1.78734E−12 | −3.0721E−16 | 5.13395E−21 | 3.8884E−23 |
|  | $S_8$ | 10000 | 1.9058E−06 | −9.5168E−09 | 6.61089E−12 | −2.5771E−16 | −1.4497E−18 | 5.00348E−22 |
| Fifth Lens | $S_9$ | −1685.49237 | 1.91107E−06 | −3.8934E−09 | 4.10751E−12 | −1.3881E−15 | −4.4614E−19 | 1.82158E−22 |
|  | $S_{10}$ | 12.53664 | 4.12339E−06 | −2.738E−09 | 1.12377E−11 | −1.3561E−14 | 7.28701E−18 | −1.5922E−21 |
| Sixth Lens | $S_{11}$ | 0.39333 | −1.2905E−06 | 6.70291E−09 | −1.3417E−11 | 1.55706E−14 | −8.892E−18 | 2.12403E−21 |
|  | — | — | — | — | — | — | — | — |

TABLE 7 f = 84.3577 mm    Fno = 0.98

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.37788 | — | 1 |
| First Lens | $S_1$ | 68.75105767 | 8 | 57.9 | 1.4924 |
|  | $S_2$ | 135.5671978 | 12.7911524 |  | 1 |
| Second Lens | $S_3$ | −205 | 10 | 57.9 | 1.4924 |
|  | $S_4$ | −204.9 | 4 |  | 1 |
| Third Lens | $S_5$ | 71.51 | 21.03 | 61.25 | 1.59137 |
|  | $S_6$ | −351.82 | 6.51077168 |  | 1 |
| Fourth Lens | $S_7$ | −437.8841248 | 5.5 | 57.9 | 1.4924 |
|  | $S_8$ | −10000 | 3.3465175 |  | 1 |
| Fifth Lens | $S_9$ | 10000 | 6.52656101 | 57.9 | 1.4924 |
|  | $S_{10}$ | −150.1037327 | 28.7171143 |  | 1 |
| Sixth Lens | $S_{11}$ | −47.22084434 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient |  |  |  |  |  |  |
|---|---|---|---|---|---|---|---|---|
|  |  | K | A | B | C | D | E | F |
| First Lens | $S_1$ | 0.29386 | −1.9367E−06 | −8.4629E−10 | −1.3042E−12 | 1.46436E−15 | −4.9022E−19 | 5.55627E−23 |
|  | $S_2$ | 0.31216 | −5.4409E−07 | −1.9853E−09 | 2.31682E−12 | −1.2286E−15 | 3.73876E−19 | −4.7722E−23 |
| Second Lens | $S_3$ | 15.10123 | 3.1704E−06 | −5.973E−10 | 2.68639E−12 | −2.5865E−15 | 1.0305E−18 | −1.6587E−22 |
|  | $S_4$ | −301.20374 | −7.3174E−07 | 3.91226E−09 | −3.7075E−12 | 1.88124E−15 | −5.2602E−19 | 5.27895E−23 |
| Fourth Lens | $S_7$ | 35.88362 | 1.25424E−06 | −3.519E−09 | 1.87437E−12 | −3.8866E−16 | −4.6194E−21 | 5.16993E−23 |
|  | $S_8$ | 4073.29950 | 1.50111E−06 | −8.9244E−09 | 6.14541E−12 | 4.63051E−17 | −1.6199E−18 | 5.43749E−22 |

TABLE 7-continued

| | | | | | | | | |
|---|---|---|---|---|---|---|---|---|
| Fifth Lens | $S_9$ | 9128.88371 | 1.81047E−06 | −3.5093E−09 | 3.97361E−12 | −1.8227E−15 | −8.1854E−20 | 1.09456E−22 |
| | $S_{10}$ | 3.18779 | 3.72431E−06 | −2.3499E−09 | 1.06249E−11 | −1.3735E−14 | 7.68048E−18 | −1.7414E−21 |
| Sixth Lens | $S_{11}$ | 0.38988 | −1.5244E−06 | 7.36808E−09 | −1.4456E−11 | 1.62984E−14 | −9.0746E−18 | 2.10864E−21 |

TABLE 8 f = 84.4154 mm    Fno = 0.98

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.25647 | — | 1 |
| First Lens | $S_1$ | 68.98651783 | 8 | 57.9 | 1.4924 |
| | $S_2$ | 133.1854417 | 12.6768266 | | 1 |
| Second Lens | $S_3$ | −205 | 10 | 57.9 | 1.4924 |
| | $S_4$ | −204.9 | 4 | | 1 |
| Third Lens | $S_5$ | 70.96879231 | 21.03 | 61.25 | 1.59137 |
| | $S_6$ | −393.0088022 | 6.46676375 | | 1 |
| Fourth Lens | $S_7$ | −529.2142585 | 5.5 | 57.9 | 1.4924 |
| | $S_8$ | −10000 | 3.50985355 | | 1 |
| Fifth Lens | $S_9$ | 10000 | 6.53176244 | 57.9 | 1.4924 |
| | $S_{10}$ | −148.9545186 | 28.8283203 | | 1 |
| Sixth Lens | $S_{11}$ | −46.77859401 | 4.5 | 57.9 | 1.4924 |
| | $S_{12}$ | −50.132 | 13.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | 0.32936 | −2.0005E−06 | −7.2853E−10 | −1.378E−12 | 1.50771E−15 | −5.0624E−19 | 5.78027E−23 |
| | $S_2$ | 0.28423 | −6.1839E−07 | −1.731E−09 | 2.06592E−12 | −1.0723E−15 | 3.22374E−19 | −4.0369E−23 |
| Second Lens | $S_3$ | 13.97285 | 3.17344E−06 | −5.0856E−10 | 2.53267E−12 | −2.5061E−15 | 1.01498E−18 | −1.6614E−22 |
| | $S_4$ | −300.61083 | −7.1884E−07 | 4.01512E−09 | −3.9103E−12 | 2.03605E−15 | −5.8357E−19 | 6.13539E−23 |
| Fourth Lens | $S_7$ | 46.21205 | 1.26126E−06 | −3.5861E−09 | 1.86189E−12 | −4.1466E−16 | 1.15305E−20 | 5.28802E−23 |
| | $S_8$ | 7176.03144 | 1.42115E−06 | −8.7923E−09 | 5.89077E−12 | 2.45661E−16 | −1.707E−18 | 5.59941E−22 |
| Fifth Lens | $S_9$ | 10000 | 1.80407E−06 | −3.631E−09 | 4.01897E−12 | −1.5548E−15 | −3.4344E−19 | 1.7924E−22 |
| | $S_{10}$ | 2.43718 | 3.66681E−06 | −2.1465E−09 | 9.8819E−12 | −1.2688E−14 | 7.06962E−18 | −1.6213E−21 |
| Sixth Lens | $S_{11}$ | 0.37544 | −1.2529E−06 | 6.24042E−09 | −1.1893E−11 | 1.35026E−14 | −7.6083E−18 | 1.81223E−21 |

TABLE 9 f = 85.3248 mm    Fno = 0.99

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.38121 | — | 1 |
| First Lens | $S_1$ | 70.4671184 | 8 | 57.9 | 1.4924 |
| | $S_2$ | 136.3893945 | 11.9786543 | | 1 |
| Second Lens | $S_3$ | −205 | 10 | 57.9 | 1.4924 |
| | $S_4$ | −204.9 | 4 | | 1 |
| Third Lens | $S_5$ | 73.52606553 | 21.03 | 61.25 | 1.59137 |
| | $S_6$ | −359.299903 | 6.1144772 | | 1 |
| Fourth Lens | $S_7$ | −788.6594692 | 5.5 | 57.9 | 1.4924 |
| | $S_8$ | −10000 | 4.52721299 | | 1 |
| Fifth Lens | $S_9$ | 10000 | 6.4707413 | 57.9 | 1.4924 |
| | $S_{10}$ | −158.4988016 | 28.7977013 | | 1 |
| Sixth Lens | $S_{11}$ | −46.47320065 | 4.5 | 57.9 | 1.4924 |
| | $S_{12}$ | −50.132 | 13.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

TABLE 9-continued

| Constituent Lens | Lens Surface | Aspherical Surface Coefficient | | | | | | |
|---|---|---|---|---|---|---|---|---|
| | | K | A | B | C | D | E | F |
| First Lens | $S_1$ | −0.18951 | −2.008E−06 | −6.9197E−10 | −1.3152E−12 | 1.54513E−15 | −5.3793E−19 | 6.39826E−23 |
| | $S_2$ | −4.68726 | −7.0512E−07 | −1.2997E−09 | 1.87142E−12 | −1.0948E−15 | 3.65936E−19 | −5.0128E−23 |
| Second Lens | $S_3$ | 11.03664 | 3.0548E−06 | 2.54674E−12 | 2.05057E−12 | −2.3763E−15 | 1.02423E−18 | −1.7506E−22 |
| | $S_4$ | −236.99853 | −4.7671E−07 | 3.87643E−09 | −3.9162E−12 | 2.09505E−15 | −6.1882E−19 | 6.74463E−23 |
| Fourth Lens | $S_7$ | −3720.81593 | 8.98241E−07 | −3.2625E−09 | 1.72844E−12 | −6.8545E−16 | 2.41511E−19 | 1.88746E−24 |
| | $S_8$ | −8000.21555 | 1.37963E−06 | −7.8917E−09 | 4.77444E−12 | 4.54095E−16 | −1.4593E−18 | 4.55965E−22 |
| Fifth Lens | $S_9$ | 4714.41011 | 1.75583E−06 | −3.0373E−09 | 1.82974E−12 | 1.25736E−15 | −1.7261E−18 | 3.82663E−22 |
| | $S_{10}$ | 4.70906 | 3.54069E−06 | −1.3809E−09 | 5.96831E−12 | −6.9068E−15 | 3.6598E−18 | −9.1402E−22 |
| Sixth Lens | $S_{11}$ | 0.36612 | −1.7491E−06 | 8.1667E−09 | −1.5806E−11 | 1.77026E−14 | −9.8774E−18 | 2.30807E−21 |

TABLE 10 f = 85.3328 mm   Fno = 0.99

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.57168 | — | 1 |
| First Lens | $S_1$ | 70.48931999 | 8 | 57.9 | 1.4924 |
| | $S_2$ | 139.6898351 | 11.8548549 | | 1 |
| Second Lens | $S_3$ | −205 | 10 | 57.9 | 1.4924 |
| | $S_4$ | −204.9 | 4 | | 1 |
| Third Lens | $S_5$ | 75.1255862 | 21.03 | 61.25 | 1.59137 |
| | $S_6$ | −320.8370063 | 6.0207369 | | 1 |
| Fourth Lens | $S_7$ | −651.8025454 | 5.5 | 57.9 | 1.4924 |
| | $S_8$ | −10000 | 4.54960983 | | 1 |
| Fifth Lens | $S_9$ | 10000 | 6.52023053 | 57.9 | 1.4924 |
| | $S_{10}$ | −154.2770195 | 28.7528844 | | 1 |
| Sixth Lens | $S_{11}$ | −45.96972031 | 4.5 | 57.9 | 1.4924 |
| | $S_{12}$ | −50.132 | 13.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | −0.16085 | −1.9931E−06 | −6.1428E−10 | −1.327E−12 | 1.53063E−15 | −5.3429E−19 | 6.40688E−23 |
| | $S_2$ | −5.48157 | −6.2178E−07 | −1.2375E−09 | 1.86087E−12 | −1.0815E−15 | 3.51239E−19 | −4.6146E−23 |
| Second Lens | $S_3$ | 11.03664 | 3.0548E−06 | 2.54674E−12 | 2.05057E−12 | −2.3763E−15 | 1.02423E−18 | −1.7506E−22 |
| | $S_4$ | −232.15612 | −4.1714E−07 | 3.82918E−09 | −3.9151E−12 | 2.09707E−15 | −6.1544E−19 | 6.6229E−23 |
| Fourth Lens | $S_7$ | −2783.37279 | 1.02798E−06 | −3.2609E−09 | 1.70197E−12 | −6.9882E−16 | 2.51592E−19 | 2.06592E−24 |
| | $S_8$ | −5815.84070 | 1.68887E−06 | −8.2601E−09 | 4.88529E−12 | 5.63386E−16 | −1.5621E−18 | 4.82151E−22 |
| Fifth Lens | $S_9$ | 10000 | 1.76037E−06 | −3.1847E−09 | 1.9512E−12 | 1.35501E−15 | −1.8178E−18 | 3.9185E−22 |
| | $S_{10}$ | 6.86391 | 3.62699E−06 | −1.633E−09 | 6.47883E−12 | −7.1179E−15 | 3.63085E−18 | −8.98E−22 |
| Sixth Lens | $S_{11}$ | 0.34269 | −1.5809E−06 | 7.92344E−09 | −1.5522E−11 | 1.75281E−14 | −9.8269E−18 | 2.30807E−21 |

TABLE 11 f = 85.3128 mm   Fno = 0.99

| Constituent Lens | Lens Surface | Curvature Radius Rd | Inter-plane Distance TH | Abbe Number νd | Refractive Index nd |
|---|---|---|---|---|---|
| Screen | — | INFINITY | 1034.07953 | — | 1 |
| First Lens | $S_1$ | 71.67477797 | 8 | 57.9 | 1.4924 |
| | $S_2$ | 157.6854683 | 11.168804 | | 1 |
| Second Lens | $S_3$ | −205 | 10 | 57.9 | 1.4924 |
| | $S_4$ | −204.9 | 4 | | 1 |
| Third Lens | $S_5$ | 83.01705706 | 21.03 | 61.25 | 1.59137 |
| | $S_6$ | −216.4642508 | 5.74241414 | | 1 |
| Fourth Lens | $S_7$ | −454.5959279 | 5.5 | 57.9 | 1.4924 |
| | $S_8$ | −9999.989671 | 5.3363542 | | 1 |

TABLE 11-continued

| Constituent Lens | Lens Surface | Curvature Radius Rd | Inter-plane Distance TH | Abbe Number vd | Refractive Index nd |
|---|---|---|---|---|---|
| Fifth Lens | $S_9$ | 9999.999847 | 6.68169993 | 57.9 | 1.4924 |
|  | $S_{10}$ | −153.1736404 | 28.2612014 |  | 1 |
| Sixth Lens | $S_{11}$ | −45.55818797 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | −0.28346 | −1.9037E−06 | −6.7358E−10 | −1.1258E−12 | 1.39622E−15 | −5.0375E−19 | 6.21755E−23 |
|  | $S_2$ | −3.33247 | −6.2424E−07 | −1.2029E−09 | 2.01784E−12 | −1.1956E−15 | 3.73225E−19 | −4.7519E−23 |
| Second Lens | $S_3$ | 11.03664 | 3.0548E−06 | 2.54674E−12 | 2.05057E−12 | −2.3763E−15 | 1.02423E−18 | −1.7506E−22 |
|  | $S_4$ | −225.63318 | −3.1989E−07 | 3.67094E−09 | −3.8831E−12 | 2.12292E−15 | −6.1703E−19 | 6.36798E−23 |
| Fourth Lens | $S_7$ | −922.31345 | 1.44073E−06 | −3.657E−09 | 1.91375E−12 | −4.6061E−16 | 5.42335E−21 | 5.7396E−23 |
|  | $S_8$ | −10000 | 2.21308E−06 | −7.7634E−09 | 3.44442E−12 | 1.86419E−15 | −2.0984E−18 | 5.65141E−22 |
| Fifth Lens | $S_9$ | 10000 | 1.80943E−06 | −2.0311E−09 | −1.5645E−12 | 5.22096E−15 | −3.697E−18 | 7.27499E−22 |
|  | $S_{10}$ | 12.22164 | 3.49826E−06 | −4.1567E−10 | 2.0309E−12 | −1.0346E−15 | 6.06781E−20 | −9.8332E−23 |
| Sixth Lens | $S_{11}$ | 0.31789 | −1.5277E−06 | 7.6013E−09 | −1.518E−11 | 1.73855E−14 | −9.8169E−18 | 2.30807E−21 |

TABLE 12 f = 85.0425 mm    Fno = 0.99

| Constituent Lens | Lens Surface | Curvature Radius Rd | Inter-plane Distance TH | Abbe Number vd | Refractive Index nd |
|---|---|---|---|---|---|
| Screen | — | INFINITY | 1033.13841 | — | 1 |
| First Lens | $S_1$ | 69.76661368 | 8 | 57.9 | 1.4924 |
|  | $S_2$ | 128.8824996 | 12.2410776 |  | 1 |
| Second Lens | $S_3$ | −205 | 10 | 57.9 | 1.4924 |
|  | $S_4$ | −205 | 4 |  | 1 |
| Third Lens | $S_5$ | 70.56467585 | 21.03 | 61.25 | 1.59137 |
|  | $S_6$ | −445.6139473 | 6.40246764 |  | 1 |
| Fourth Lens | $S_7$ | −900.558866 | 5.5 | 57.9 | 1.4924 |
|  | $S_8$ | −10000 | 4.0644817 |  | 1 |
| Fifth Lens | $S_9$ | 10000 | 6.44676102 | 57.9 | 1.4924 |
|  | $S_{10}$ | −156.7817095 | 28.9768047 |  | 1 |
| Sixth Lens | $S_{11}$ | −46.51331017 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | −0.20073 | −2.0145E−06 | −6.7789E−10 | −1.3445E−12 | 1.56016E−15 | −5.3967E−19 | 6.38471E−23 |
|  | $S_2$ | −4.39375 | −7.1489E−07 | −1.3282E−09 | 1.85606E−12 | −1.0663E−15 | 3.53973E−19 | −4.7784E−23 |
| Second Lens | $S_3$ | 12.72449 | 3.11743E−06 | −3.8107E−11 | 2.06963E−12 | −2.362E−15 | 1.01345E−18 | −1.7285E−22 |
|  | $S_4$ | −255.21881 | −5.2937E−07 | 3.95093E−09 | −3.945E−12 | 2.08839E−15 | −6.1552E−19 | 6.73382E−23 |
| Fourth Lens | $S_7$ | −107.12475 | 1.10496E−06 | −3.6226E−09 | 1.93535E−12 | −7.1829E−16 | 2.41277E−19 | 2.35218E−24 |
|  | $S_8$ | 681.65762 | 8.76095E−07 | −7.6767E−09 | 4.96913E−12 | 2.86253E−16 | −1.4454E−18 | 4.69954E−22 |
| Fifth Lens | $S_9$ | −7243.63376 | 1.47446E−06 | −2.6658E−09 | 2.21631E−12 | 4.97539E−15 | −1.4444E−18 | 3.85867E−22 |
|  | $S_{10}$ | 2.43237 | 3.41161E−06 | −1.0999E−09 | 6.86482E−12 | −8.8606E−15 | 4.9238E−18 | −1.1878E−21 |
| Sixth Lens | $S_{11}$ | 0.37381 | −1.5683E−06 | 7.79856E−09 | −1.5184E−11 | 1.71538E−14 | −9.6422E−18 | 2.27057E−21 |

TABLE 13 f = 85.1658 mm    Fno = 1.00

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.53574 | — | 1 |
| First Lens | $S_1$ | 70.67570216 | 8 | 57.9 | 1.4924 |
|  | $S_2$ | 138.6317098 | 12.0020581 |  | 1 |
| Second Lens | $S_3$ | −205 | 10 | 57.9 | 1.4924 |
|  | $S_4$ | −204.9 | 4 |  | 1 |
| Third Lens | $S_5$ | 73.64284474 | 21.03 | 61.25 | 1.59137 |
|  | $S_6$ | −327.8503751 | 6.22578374 |  | 1 |
| Fourth Lens | $S_7$ | −619.095782 | 5.5 | 57.9 | 1.4924 |
|  | $S_8$ | −10000 | 4.20380058 |  | 1 |
| Fifth Lens | $S_9$ | 10000 | 6.45832342 | 57.9 | 1.4924 |
|  | $S_{10}$ | −158.8433674 | 28.8442941 |  | 1 |
| Sixth Lens | $S_{11}$ | −46.39727369 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | −0.24046 | −1.9823E−06 | −6.5941E−10 | −1.3323E−12 | 1.54958E−15 | −5.4079E−19 | 6.47379E−23 |
|  | $S_2$ | −4.31775 | −6.8969E−07 | −1.3029E−09 | 1.8817E−12 | −1.0853E−15 | 3.53017E−19 | −4.7154E−23 |
| Second Lens | $S_3$ | 12.64045 | 3.08868E−06 | −2.4569E−11 | 2.0727E−12 | −2.3621E−15 | 1.01113E−18 | −1.7204E−22 |
|  | $S_4$ | −245.38788 | −5.0548E−07 | 3.84953E−09 | −3.8736E−12 | 2.06994E−15 | −6.0883E−19 | 6.56211E−23 |
| Fourth Lens | $S_7$ | −1458.19709 | 8.212E−07 | −3.2966E−09 | 1.87756E−12 | −7.4929E−16 | 2.5259E−19 | 7.31846E−25 |
|  | $S_8$ | −2115.68245 | 1.27984E−06 | −7.9803E−09 | 5.02427E−12 | 3.82793E−16 | −1.5081E−18 | 4.81516E−22 |
| Fifth Lens | $S_9$ | 4309.18681 | 1.66465E−06 | −2.7593E−09 | 1.74616E−12 | 1.04238E−15 | −1.6008E−18 | 3.75422E−22 |
|  | $S_{10}$ | 3.30687 | 3.42067E−06 | −1.0553E−09 | 6.16664E−12 | −7.7988E−15 | 4.29961E−18 | −1.0551E−21 |
| Sixth Lens | $S_{11}$ | 0.36132 | −1.5323E−06 | 7.44718E−09 | −1.4676E−11 | 1.67607E−14 | −9.4809E−18 | 2.24169E−21 |

TABLE 14 f = 85.2399 mm    Fno = 1.00

| Constituent Lens | Lens Surface | Curvature Radius Rd | Inter-plane Distance TH | Abbe Number νd | Refractive Index nd |
|---|---|---|---|---|---|
| Screen | — | INFINITY | 1034.08971 | — | 1 |
| First Lens | $S_1$ | 72.0143747 | 8 | 57.9 | 1.4924 |
|  | $S_2$ | 152.9673103 | 11.2488614 |  | 1 |
| Second Lens | $S_3$ | −205 | 10 | 57.9 | 1.4924 |
|  | $S_4$ | −205 | 4 |  | 1 |
| Third Lens | $S_5$ | 79.80824097 | 21.03 | 61.25 | 1.59137 |
|  | $S_6$ | −239.5606672 | 5.97584157 |  | 1 |
| Fourth Lens | $S_7$ | −552.7776692 | 5.5 | 57.9 | 1.4924 |
|  | $S_8$ | −10000 | 4.85513129 |  | 1 |
| Fifth Lens | $S_9$ | 10000 | 6.48072548 | 57.9 | 1.4924 |
|  | $S_{10}$ | −163.5917729 | 28.6197327 |  | 1 |
| Sixth Lens | $S_{11}$ | −45.99499776 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient | | | | | | |
|---|---|---|---|---|---|---|---|---|
|  |  | K | A | B | C | D | E | F |
| First Lens | $S_1$ | −0.35706 | −1.9377E−06 | −7.3333E−10 | −1.2166E−12 | 1.50658E−15 | −5.4008E−19 | 6.60182E−23 |
|  | $S_2$ | −1.69855 | −7.1061E−07 | −1.3838E−09 | 2.20359E−12 | −1.3714E−15 | 4.60209E−19 | −6.3219E−23 |
| Second Lens | $S_3$ | 14.08223 | 3.12073E−06 | 1.32659E−11 | 2.10868E−12 | −2.4366E−15 | 1.04489E−18 | −1.7629E−22 |
|  | $S_4$ | −227.79109 | −3.761E−07 | 3.60694E−09 | −3.6956E−12 | 1.98966E−15 | −5.801E−19 | 6.08258E−23 |
| Fourth Lens | $S_7$ | −1284.46330 | 1.03838E−06 | −3.3364E−09 | 1.68089E−12 | −3.5865E−16 | −1.0095E−20 | 5.91221E−23 |
|  | $S_8$ | −10000 | 1.59352E−06 | −7.8514E−09 | 4.452E−12 | 8.83889E−16 | −1.6977E−18 | 5.05104E−22 |

TABLE 14-continued

| | | | | | | | | |
|---|---|---|---|---|---|---|---|---|
| Fifth Lens | $S_9$ | 10000 | 1.85977E−06 | −2.6541E−09 | 3.41523E−13 | 2.95708E−15 | −2.555E−18 | 5.22043E−22 |
| | $S_{10}$ | 7.98045 | 3.58141E−06 | −1.0938E−09 | 4.47174E−12 | −4.8572E−15 | 2.46037E−18 | −6.4866E−22 |
| Sixth Lens | $S_{11}$ | 0.33259 | −1.4094E−06 | 6.63557E−09 | −1.3182E−11 | 1.53405E−14 | −8.8031E−18 | 2.11419E−21 |

TABLE 15 f = 85.2423 mm    Fno = 1.00

| Constituent Lens | Lens Surface | Curvature Radius Rd | Inter-plane Distance TH | Abbe Number νd | Refractive Index nd |
|---|---|---|---|---|---|
| Screen | — | INFINITY | 1033.59606 | — | 1 |
| First Lens | $S_1$ | 69.89582206 | 8 | 57.9 | 1.4924 |
| | $S_2$ | 130.8654565 | 11.7688558 | | 1 |
| Second Lens | $S_3$ | −205 | 10 | 57.9 | 1.4924 |
| | $S_4$ | −204.9 | 4 | | 1 |
| Third Lens | $S_5$ | 72.28915171 | 20.9622058 | 61.25 | 1.59137 |
| | $S_6$ | −366.4764704 | 6.27683416 | | 1 |
| Fourth Lens | $S_7$ | −740.800438 | 5.5 | 57.9 | 1.4924 |
| | $S_8$ | −10000 | 4.31857327 | | 1 |
| Fifth Lens | $S_9$ | 10000 | 6.45435785 | 57.9 | 1.4924 |
| | $S_{10}$ | −157.223289 | 28.9231084 | | 1 |
| Sixth Lens | $S_{11}$ | −45.94911947 | 4.5 | 57.9 | 1.4924 |
| | $S_{12}$ | −50.132 | 13.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | 0.02471 | −2.0551E−06 | −8.8419E−10 | −1.2794E−12 | 1.61955E−15 | −5.8164E−19 | 7.08449E−23 |
| | $S_2$ | −1.74324 | −7.7408E−07 | −1.586E−09 | 2.19327E−12 | −1.2494E−15 | 4.0385E−19 | −5.3634E−23 |
| Second Lens | $S_3$ | 4.47724 | 2.99626E−06 | −4.1418E−11 | 2.11679E−12 | −2.4232E−15 | 1.0306E−18 | −1.7341E−22 |
| | $S_4$ | −233.17429 | −4.1633E−07 | 3.72683E−09 | −3.718E−12 | 1.95955E−15 | −5.7461E−19 | 6.26566E−23 |
| Fourth Lens | $S_7$ | −3368.67348 | 6.69944E−07 | −3.0296E−09 | 1.39856E−12 | −3.9307E−16 | 1.22544E−19 | 2.34156E−23 |
| | $S_8$ | 10000 | 1.32239E−06 | −8.3792E−09 | 5.40905E−12 | 2.62592E−16 | −1.5407E−18 | 5.03747E−22 |
| Fifth Lens | $S_9$ | 9438.96972 | 1.83767E−06 | −3.0865E−09 | 1.45846E−12 | 2.12513E−15 | −2.4678E−18 | 6.00611E−22 |
| | $S_{10}$ | 10.99813 | 3.84829E−06 | −1.0795E−09 | 5.71733E−12 | −6.7748E−15 | 3.59259E−18 | −8.8449E−22 |
| Sixth Lens | $S_{11}$ | 0.34240 | −1.3775E−06 | 7.2554E−09 | −1.4281E−11 | 1.63231E−14 | −9.2464E−18 | 2.19886E−21 |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | 0.02471 | −2.0551E−06 | −8.8419E−10 | −1.2794E−12 | 1.61955E−15 | −5.8164E−19 | 7.08449E−23 |
| | $S_2$ | −1.74324 | −7.7408E−07 | −1.586E−09 | 2.19327E−12 | −1.2494E−15 | 4.0385E−19 | −5.3634E−23 |
| Second Lens | $S_3$ | 4.47724 | 2.99626E−06 | −4.1418E−11 | 2.11679E−12 | −2.4232E−15 | 1.0306E−18 | −1.7341E−22 |
| | $S_4$ | −233.17429 | −4.1633E−07 | 3.72683E−09 | −3.718E−12 | 1.95955E−15 | −5.7461E−19 | 6.26566E−23 |
| Fourth Lens | $S_7$ | −3368.67348 | 6.69944E−07 | −3.0296E−09 | 1.39856E−12 | −3.9307E−16 | 1.22544E−19 | 2.34156E−23 |
| | $S_8$ | 10000 | 1.32239E−06 | −8.3792E−09 | 5.40905E−12 | 2.62592E−16 | −1.5407E−18 | 5.03747E−22 |
| Fifth Lens | $S_9$ | 9438.96972 | 1.83767E−06 | −3.0865E−09 | 1.45846E−12 | 2.12513E−15 | −2.4678E−18 | 6.00611E−22 |
| | $S_{10}$ | 10.99813 | 3.84829E−06 | −1.0795E−09 | 5.71733E−12 | −6.7748E−15 | 3.59259E−18 | −8.8449E−22 |
| Sixth Lens | $S_{11}$ | 0.34240 | −1.3775E−06 | 7.2554E−09 | −1.4281E−11 | 1.63231E−14 | −9.2464E−18 | 2.19886E−21 |

TABLE 16 f = 85.2761 mm    Fno = 1.00

| Constituent Lens | Lens Surface | Curvature Radius Rd | Inter-plane Distance TH | Abbe Number vd | Refractive Index nd |
|---|---|---|---|---|---|
| Screen | — | INFINITY | 1033.45325 | — | 1 |
| First Lens | $S_1$ | 69.99969294 | 8 | 57.9 | 1.4924 |
|  | $S_2$ | 129.8402825 | 11.8859064 |  | 1 |
| Second Lens | $S_3$ | −205 | 10 | 57.9 | 1.4924 |
|  | $S_4$ | −204.9 | 4 |  | 1 |
| Third Lens | $S_5$ | 71.39397034 | 21.03 | 61.25 | 1.59137 |
|  | $S_6$ | −391.4532911 | 6.29453661 |  | 1 |
| Fourth Lens | $S_7$ | −753.7724321 | 5.5 | 57.9 | 1.4924 |
|  | $S_8$ | −10000 | 4.2136035 |  | 1 |
| Fifth Lens | $S_9$ | 10000 | 6.44780779 | 57.9 | 1.4924 |
|  | $S_{10}$ | −156.825536 | 28.9748921 |  | 1 |
| Sixth Lens | $S_{11}$ | −46.03257918 | 4.5 | 57.9 | 1.4924 |
|  | $S_{12}$ | −50.132 | 13.6 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient |  |  |  |  |  |  |
|---|---|---|---|---|---|---|---|---|
|  |  | K | A | B | C | D | E | F |
| First Lens | $S_1$ | −0.15836 | −2.0751E−06 | −7.3101E−10 | −1.328E−12 | 1.60688E−15 | −5.6924E−19 | 6.87796E−23 |
|  | $S_2$ | −5.19115 | −6.9418E−07 | −1.3666E−09 | 2.02675E−12 | −1.2225E−15 | 4.1663E−19 | −5.7273E−23 |
| Second Lens | $S_3$ | 3.25108 | 3.0013E−06 | 5.9886E−11 | 2.01547E−12 | −2.4254E−15 | 1.06131E−18 | −1.8295E−22 |
|  | $S_4$ | −226.75689 | −3.4169E−07 | 3.7065E−09 | −3.7158E−12 | 1.94741E−15 | −5.6668E−19 | 6.02576E−23 |
| Fourth Lens | $S_7$ | −3715.22204 | 6.53944E−07 | −2.983E−09 | 1.31826E−12 | −3.7605E−16 | 1.46071E−19 | 1.49998E−23 |
|  | $S_8$ | 4979.23849 | 1.279E−06 | −8.3817E−09 | 5.41004E−12 | 2.9766E−15 | −1.5729E−18 | 5.13793E−22 |
| Fifth Lens | $S_9$ | −10000 | 1.75566E−06 | −3.0142E−09 | 1.67983E−12 | 1.768E−15 | −2.294E−18 | 5.74535E−22 |
|  | $S_{10}$ | 13.74825 | 3.88697E−06 | −7.5664E−10 | 5.46538E−12 | −6.4462E−15 | 3.28039E−18 | −7.5498E−22 |
| Sixth Lens | $S_{11}$ | 0.34842 | −1.4214E−06 | 7.46672E−09 | −1.4645E−11 | 1.67159E−14 | −9.4763E−18 | 2.25447E−21 |
|  | — | — | — | — | — | — | — | — |

TABLE 17 f = 85.130 mm    Fno = 1.00

| Constituent Lens | Lens Surface | Curvature Radius Rd | Inter-plane Distance TH | Abbe Number vd | Refractive Index nd |
|---|---|---|---|---|---|
| Screen | — | INFINITY | 1034.1566 | — | 1 |
| First Lens | $S_1$ | 71.53796269 | 8 | 57.9 | 1.4924 |
|  | $S_2$ | 149.0405108 | 10.9286161 |  | 1 |
| Second Lens | $S_3$ | −205 | 10 | 57.9 | 1.4924 |
|  | $S_4$ | −204.9 | 4 |  | 1 |
| Third Lens | $S_5$ | 80.53 | 21.03 | 61.25 | 1.59137 |
|  | $S_6$ | −233.56 | 5.94408577 |  | 1 |
| Fourth Lens | $S_7$ | −589.0342132 | 6.42370143 | 57.9 | 1.4924 |
|  | $S_8$ | −10000 | 4.72275803 |  | 1 |
| Fifth Lens | $S_9$ | 10000 | 6.45268019 | 57.9 | 1.4924 |
|  | $S_{10}$ | −165.4158415 | 28.941563 |  | 1 |
| Sixth Lens | $S_{11}$ | −45.17508931 | 4.5 | 57.9 | 1.4924 |
|  | $S_{12}$ | −50.132 | 12.8 |  | 1.44703 |
| Transparent Medium | Refrigerant | INFINITY |  | — |  |
| Braun Tube | FACE Plane | INFINITY | 14.1 | — | 1.56232 |
|  | Fluophor | −350 | 0 |  |  |

| Constituent Lens | Lens Surface | Aspherical Surface Coefficient |  |  |  |  |  |  |
|---|---|---|---|---|---|---|---|---|
|  |  | K | A | B | C | D | E | F |
| First Lens | $S_1$ | −0.39442 | −1.9958E−06 | −6.7936E−10 | −1.2121E−12 | 1.48553E−15 | −5.3398E−19 | 6.57699E−23 |
|  | $S_2$ | −4.91948 | −7.3964E−07 | −1.2464E−09 | 2.21705E−12 | −1.4121E−15 | 4.64702E−19 | −6.1693E−23 |
| Second Lens | $S_3$ | 15.44299 | 2.85547E−06 | 3.67203E−10 | 1.97615E−12 | −2.4653E−15 | 1.08817E−18 | −1.8545E−22 |
|  | $S_4$ | −216.61532 | −4.9279E−07 | 3.72207E−09 | −3.7455E−12 | 1.97061E−15 | −5.4336E−19 | 5.03007E−23 |
| Fourth Lens | $S_7$ | −1187.14432 | 7.59672E−07 | −2.7216E−09 | 1.31034E−12 | −2.1205E−16 | −6.4585E−20 | 6.02307E−23 |
|  | $S_8$ | 10000 | 1.14904E−06 | −7.1081E−09 | 4.16251E−12 | 7.27837E−16 | −1.5207E−18 | 4.48868E−22 |

TABLE 17-continued

| | | | | | | | | |
|---|---|---|---|---|---|---|---|---|
| Fifth Lens | $S_9$ | 10000 | 1.75408E−06 | −2.205E−09 | −2.3769E−13 | 3.32358E−15 | −2.7654E−18 | 6.04424E−22 |
| | $S_{10}$ | 8.01086 | 3.44452E−06 | −1.7401E−10 | 2.75567E−12 | −3.2146E−15 | 1.5628E−18 | −4.19E−22 |
| Sixth Lens | $S_{11}$ | 0.25886 | −5.8996E−07 | 3.84868E−09 | −7.6668E−12 | 9.3279E−15 | −5.4594E−18 | 1.35594E−21 |
| | — | — | — | — | — | — | — | — |

TABLE 18 f = 85.245 mm    Fno = 1.00

| Constituent Lens | Lens Surface | Curvature Radius Rd | Inter-plane Distance TH | Abbe Number νd | Refractive Index nd |
|---|---|---|---|---|---|
| Screen | — | INFINITY | 1034.203 | — | 1 |
| First Lens | $S_1$ | 70.35380273 | 8 | 57.9 | 1.4924 |
| | $S_2$ | 141.0857218 | 11.4328495 | | 1 |
| Second Lens | $S_3$ | −205 | 10 | 57.9 | 1.4924 |
| | $S_4$ | −204.9 | 2.5 | | 1 |
| Third Lens | $S_5$ | 80.53 | 21.397326 | 61.25 | 1.59137 |
| | $S_6$ | −233.56 | 5.7531078 | | 1 |
| Fourth Lens | $S_7$ | −612.6389649 | 5.95074869 | 57.9 | 1.4924 |
| | $S_8$ | −9769.066343 | 5.10924765 | | 1 |
| Fifth Lens | $S_9$ | 10000 | 6.61071348 | 57.9 | 1.4924 |
| | $S_{10}$ | −154.7545825 | 27.8430056 | | 1 |
| Sixth Lens | $S_{11}$ | −45.44761267 | 4.5 | 57.9 | 1.4924 |
| | $S_{12}$ | −50.132 | 14.6 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | −0.37793 | −1.9317E−06 | −7.4227E−10 | −1.2308E−12 | 1.50752E−15 | −5.3705E−19 | 6.5438E−23 |
| | $S_2$ | −1.71368 | −7.1493E−07 | −1.3755E−09 | 2.22133E−12 | −1.3856E−15 | 4.63066E−19 | −6.2666E−23 |
| Second Lens | $S_3$ | 15.87074 | 3.1086E−06 | 1.6664E−10 | 2.03089E−12 | −2.4351E−15 | 1.06108E−18 | −1.817E−22 |
| | $S_4$ | −220.74619 | −2.7834E−07 | 3.60097E−09 | −3.7026E−12 | 1.9832E−15 | −5.7636E−19 | 5.88796E−23 |
| Fourth Lens | $S_7$ | −2085.62851 | 1.09369E−06 | −3.2666E−09 | 1.58342E−12 | −3.2456E−16 | −3.2116E−21 | 5.43405E−23 |
| | $S_8$ | −7008.45789 | 1.68199E−06 | −7.8027E−09 | 4.35704E−12 | 9.10861E−16 | −1.682E−18 | 4.98702E−22 |
| Fifth Lens | $S_9$ | 8085.43854 | 1.78922E−06 | −2.6016E−09 | 3.77734E−13 | 2.86298E−15 | −2.3599E−18 | 4.03166E−22 |
| | $S_{10}$ | 7.82995 | 3.49333E−06 | −1.0636E−09 | 4.2245E−12 | −4.3278E−15 | 2.21905E−18 | −6.6411E−22 |
| Sixth Lens | $S_{11}$ | 0.32804 | −1.2989E−06 | 6.11844E−09 | −1.1998E−11 | 1.40662E−14 | −8.161E−18 | 2.01067E−21 |
| | — | — | — | — | — | — | — | — |

TABLE 19 f = 84.946 mm    Fno = 1.00

| Constituent Lens | Lens Surface | Curvature Radius Rd | Inter-plane Distance TH | Abbe Number νd | Refractive Index nd |
|---|---|---|---|---|---|
| Screen | — | INFINITY | 1034.28946 | — | 1 |
| First Lens | $S_1$ | 72.80126218 | 8 | 57.9 | 1.4924 |
| | $S_2$ | 141.8347766 | 11.220615 | | 1 |
| Second Lens | $S_3$ | −205 | 10 | 57.9 | 1.4924 |
| | $S_4$ | −200 | 2.5 | | 1 |
| Third Lens | $S_5$ | 80.53 | 21.5947849 | 61.25 | 1.59137 |
| | $S_6$ | −233.56 | 7.12434005 | | 1 |
| Fourth Lens | $S_7$ | −757.3719873 | 6.84020741 | 57.9 | 1.4924 |
| | $S_8$ | −10000 | 4.2602126 | | 1 |
| Fifth Lens | $S_9$ | 10000 | 6.40236227 | 57.9 | 1.4924 |
| | $S_{10}$ | −171.1736864 | 29.6680197 | | 1 |
| Sixth Lens | $S_{11}$ | −44.46322538 | 4.5 | 57.9 | 1.4924 |
| | $S_{12}$ | −50.132 | 11.5 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

TABLE 19-continued

| Constituent Lens | Lens Surface | Aspherical Surface Coefficient | | | | | | |
|---|---|---|---|---|---|---|---|---|
| | | K | A | B | C | D | E | F |
| First Lens | $S_1$ | −0.57990 | −2.0407E−06 | −8.3196E−10 | −1.1094E−12 | 1.48639E−15 | −5.4681E−19 | 6.82277E−23 |
| | $S_2$ | −4.81460 | −8.1936E−07 | −1.337E−09 | 2.21965E−12 | −1.4098E−15 | 4.72071E−19 | −6.4459E−23 |
| Second Lens | $S_3$ | 16.04704 | 2.90807E−06 | 4.36302E−10 | 1.88929E−12 | −2.4594E−15 | 1.11343E−18 | −1.94E−22 |
| | $S_4$ | −202.34970 | −5.5206E−07 | 3.79938E−09 | −3.7319E−12 | 1.95904E−15 | −5.4309E−19 | 4.88829E−23 |
| Fourth Lens | $S_7$ | −270.27516 | 9.24939E−07 | −2.8096E−09 | 1.27771E−12 | −1.4393E−16 | −1.1147E−19 | 7.00054E−23 |
| | $S_8$ | 9003.88624 | 8.97586E−07 | −6.9729E−09 | 4.17E−12 | 7.16194E−16 | −1.5359E−18 | 4.52364E−22 |
| Fifth Lens | $S_9$ | −8092.31710 | 1.93395E−06 | −2.2084E−09 | −2.3078E−13 | 2.86058E−15 | −2.3404E−18 | 4.85705E−22 |
| | $S_{10}$ | 7.37845 | 3.48424E−06 | 3.15639E−10 | 2.07964E−12 | −3.1318E−15 | 1.66151E−18 | −4.2194E−22 |
| Sixth Lens | $S_{11}$ | 0.18269 | −3.0257E−07 | 3.39532E−09 | −6.9856E−12 | 8.58447E−15 | −4.9958E−18 | 1.22667E−21 |

TABLE 20 f = 85.473 mm    Fno = 1.00

| Constituent Lens | Lens Surface | Curvature Radius Rd | Inter-plane Distance TH | Abbe Number vd | Refractive Index nd |
|---|---|---|---|---|---|
| Screen | — | INFINITY | 1033.78762 | — | 1 |
| First Lens | $S_1$ | 67.49044966 | 8 | 57.9 | 1.4924 |
| | $S_2$ | 135.6474559 | 11.6262364 | | 1 |
| Second Lens | $S_3$ | −205 | 10 | 57.9 | 1.4924 |
| | $S_4$ | −205 | 2.5 | | 1 |
| Third Lens | $S_5$ | 80.53 | 21.481736 | 61.25 | 1.59137 |
| | $S_6$ | −233.56 | 4.77759403 | | 1 |
| Fourth Lens | $S_7$ | −532.3918523 | 5.5 | 57.9 | 1.4924 |
| | $S_8$ | −10000 | 5.9211438 | | 1 |
| Fifth Lens | $S_9$ | 10000 | 6.82945058 | 57.9 | 1.4924 |
| | $S_{10}$ | −140.8233755 | 25.576222 | | 1 |
| Sixth Lens | $S_{11}$ | −46.16024858 | 5.5 | 57.9 | 1.4924 |
| | $S_{12}$ | −53 | 16.4 | | 1.44703 |
| Transparent Medium | Refrigerant | INFINITY | | — | |
| Braun Tube | FACE Plane | INFINITY | 14.1 | — | 1.56232 |
| | Fluophor | −350 | 0 | | |

| Constituent Lens | Lens Surface | Aspherical Surface Coefficient | | | | | | |
|---|---|---|---|---|---|---|---|---|
| | | K | A | B | C | D | E | F |
| First Lens | $S_1$ | −0.29429 | −1.9006E−06 | −4.8315E−10 | −1.4271E−12 | 1.51638E−15 | −5.125E−19 | 6.01833E−23 |
| | $S_2$ | −1.35975 | −6.7031E−07 | −1.268E−09 | 2.20589E−12 | −1.4239E−15 | 4.8112E−19 | −6.2977E−23 |
| Second Lens | $S_3$ | 7.47666 | 2.99528E−06 | 3.61029E−11 | 2.08838E−12 | −2.4191E−15 | 1.00933E−18 | −1.6968E−22 |
| | $S_4$ | −237.53063 | −1.8929E−07 | 3.6582E−09 | −3.7633E−12 | 1.95334E−15 | −5.7643E−19 | 6.44547E−23 |
| Fourth Lens | $S_7$ | −3039.35990 | 1.74782E−06 | −3.3901E−09 | 1.28782E−12 | −2.5519E−16 | 1.13317E−19 | 2.38809E−23 |
| | $S_8$ | −10000 | 2.83369E−06 | −8.4359E−09 | 3.99418E−12 | 1.30389E−15 | −1.727E−18 | 4.97022E−22 |
| Fifth Lens | $S_9$ | 8351.37315 | 1.39453E−06 | −1.8637E−09 | −1.7086E−12 | 4.88853E−15 | −2.5685E−18 | 1.12881E−22 |
| | $S_{10}$ | 5.45332 | 3.12372E−06 | −1.4848E−09 | 4.03921E−12 | −3.6944E−15 | 2.61169E−18 | −1.1325E−21 |
| Sixth Lens | $S_{11}$ | 0.46007 | −2.0047E−06 | 8.07565E−09 | −1.5294E−11 | 1.7694E−14 | −1.0397E−17 | 2.63973E−21 |

Next, reading of these lens data based on Table 1 will be described while referring to FIGS. 1 and 2. In Table 1, the data are classified mainly into a spherical type for the lens area in the vicinity of the light axis and an aspherical type for the outer portion.

First, in Table 1, the curvature radius of the screen 14 is infinite (i.e., a plane), the interval (inter-plane distance TH) from the screen 14 to the surface $S_1$ of the first group lens 1 along the light axis is 1034.0 mm, and the refractive index (refractive index relative to sodium d line: λ=588 nm) of a medium present at this interval is 1.0. Further, the curvature radius Rd of the lens surface $S_1$ is 72.268 mm (the curvature center is near the image generation image source side), the distance (inter-plane distance TH) between the lens surfaces $S_1$ and $S_2$ along the light axis is 8.0 mm, and the refractive index of a medium present at this interval is 1.49. In the same manner, at last, the curvature radius of the fluorescent plane $P_1$ of the projection tube panel 8 is 350 mm (the curvature center is near the screen), the thickness of the projection tube panel along the light axis (the inter-plane distance TH) is 14.1 mm, and the refractive index is 1.56. The aspherical surface coefficients are shown for the surfaces $S_1$ and $S_2$ of the first lens 1, the surfaces $S_3$ and $S_4$ of the second group lens 2, the surfaces $S_7$ and $S_8$ of the fourth group lens 4, the surfaces $S_9$ and $S_{10}$ of the fifth group lens 5 and the surfaces $S_{11}$ and $S_{12}$ of the sixth group lens. It should be noted that the inter-plane distance between the i-th group lens and the j-th group lens along the light axis is hereafter represented by symbol $L_{ij}$, wherein i<j. Further, the inter-plane distance between the screen 14 and the first group lens 1 along the light axis is represented as $L_{01}$, by regarding the surface of the screen as $S_0$.

In this case, the aspherical surface coefficient is a coefficient used when the lens surface shape is expressed by the following expression 1.

$$Z(r) = \frac{r^2/Rd}{1+\sqrt{1-(1+K)r^2/Rd^2}} + Ar^4 +$$
$$Br^6 + Cr^8 + Dr^{10} + Er^{12} + Fr^{14} + \ldots + Zr^{2n}$$

[Expression 1]

It should be noted that K, A, B, C, D, E, F, . . . are arbitrary constants, n denotes an arbitrary natural number and Rd denotes a paraxial curvature radius.

Figure 7:
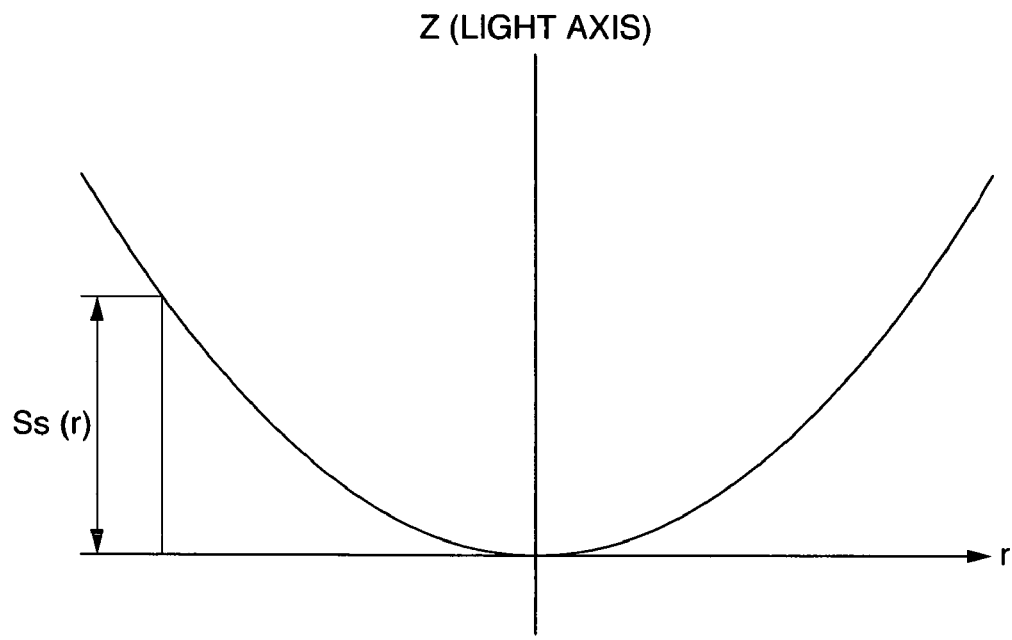
FIG. 7 is an explanatory diagram used for explaining the definition of a lens shape.
Figure 8:
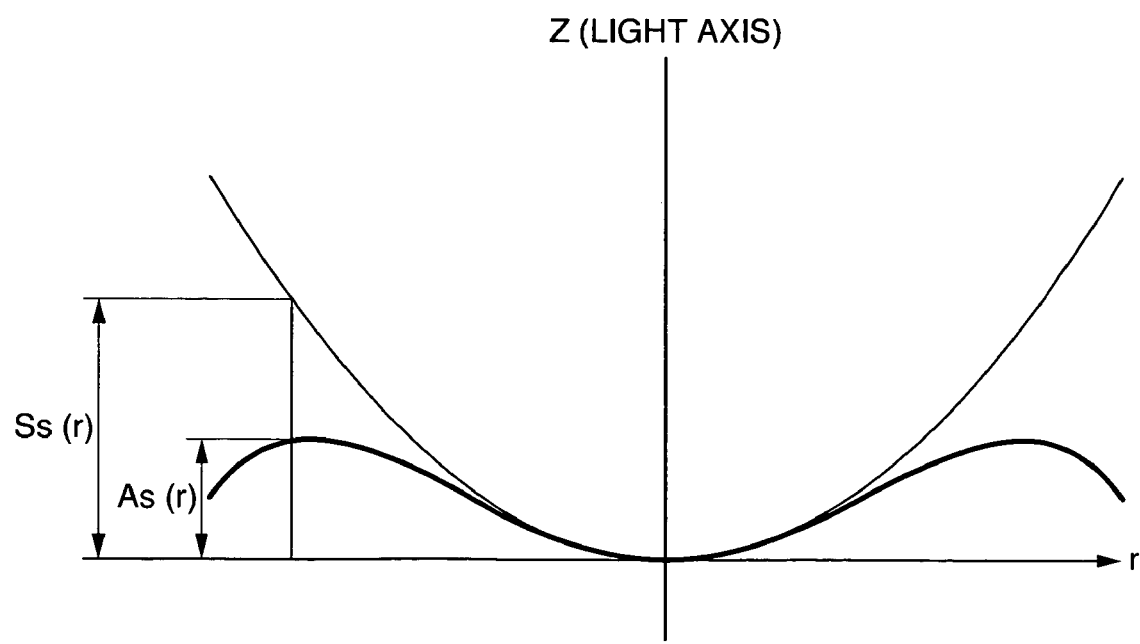
FIG. 8 is an explanatory diagram used for explaining the definition of a lens shape.

Z(r) represents the height of the lens surface when, as is shown in FIGS. 7 and 8, which are diagrams for explaining the definition of the lens shape, the Z axis shows the light axial direction from the screen to the image generation source, and the r axis shows the radial direction of the lens. r represents a distance in the radial direction, and Rd represents a curvature radius. Therefore, when the individual coefficients, such as K, A, B, C, D, E and F, are provided, the height of the lens surface (hereinafter written as an "amount of sag"), i.e., the shape, is determined in accordance with the above described expression.

FIG. 8 is a diagram for explaining an aspherical surface As(r). When the individual values are substituted into the terms for aspherical surfaces, a lens surface is obtained that is shifted by (As(r)−S(r)) from a lens surface $S_s(r)$ (FIG. 7) of only a spherical type (K=0 for the first term of expression 1). Further, as the absolute value of the ratio As(r)/S(r) (hereinafter the ratio is called an "aspherical surface ratio"), the aspherical degree is large. Furthermore, at an arbitrary r position where the secondary differential value in the above aspherical surface expression is zero, there is an inflection point whereat the direction in which the surface is inclined is changed, and when more inflection points are present, it means that the shape of the aspherical surface is more complicated. It should be noted that in the following explanation the aspherical space As(r) of the lens surface Si is represented as $A_{si}$, the spherical space S(r) is represented as $S_{si}$, and the aspherical surface ratio As(r)/S(r) is represented as $A_{si}/S_{si}$ or $A_i$.

The reading of the data in Table 1 has been described. Table 2 to Table 20 show data corresponding to other embodiments, and these data are read in the same manner.

The actions of the individual lens groups of the projection lens apparatus according to the present invention will now be described.

As is shown in FIGS. 2, 3 and 4, the first group lens 1 has a center portion having a convex meniscus shape toward the screen, and a peripheral concave portion. The first group lens 1 corrects a spherical aberration for an image light flux (upper limit light RAY 1, lower limit light RAY 2) from an object point A located on the axis of the projection tube fluorescent plane $P_1$, or corrects a comatic aberration for an image light flux (upper limit light RAY 3, lower limit light RAY 4) from an object point B in a screen peripheral portion on the projection tube fluorescent plane $P_1$. As for the vicinity of the location whereat the lower limit light RAY 4 is passed, the first group lens 1 is aspherical so that the face toward the screen is concave (the lens peripheral portion that is separate from the light axis of the lens surface on the screen side).

As is shown in FIGS. 2, 3 and 4, the center portion of the second group lens 2 has a convex shape toward the image generation source, and the peripheral portion has an aspherical shape having an inflection point whereat the shape of the lens peripheral portion is changed from the convex to the concave as it is separated from the light axis of the lens surface on the image generation source side and is near the screen side. A positive refractive index is provided locally for the peripheral portion of the second group lens 2. Further, since the relationship of the inter-plane distances $L_{12}$ and $L_{23}$ between the first group lens 1 and the third group lens 3 is maintained in the following range shown in Table 23, the inter-plane distance is well balanced to avoid an aberration that will occur when light beams entering the peripheral portions are overlapped. As a result, an astigmatic aberration and the comatic aberration can be corrected.

$$0.22 < (L_{23}/L_{12}) < 0.37 \quad \text{(Expression 2)}$$

TABLE 23

| Lens No. | $L_{12}$ | $L_{23}$ | $L_{23}/L_{12}$ | $A_8$ | $L_{34}$ | $A_8/L_{34}$ |
|---|---|---|---|---|---|---|
| 1 | 11.170 | 4.0 | 0.358 | 58.604 | 5.97 | 9.816 |
| 2 | 12.358 | 4.0 | 0.324 | 28.277 | 5.324 | 5.311 |
| 3 | 12.279 | 4.0 | 0.326 | 65.475 | 5.21 | 12.567 |
| 4 | 12.349 | 4.0 | 0.324 | 60.203 | 6.243 | 9.643 |
| 5 | 12.834 | 4.0 | 0.312 | 56.404 | 6.245 | 9.032 |
| 6 | 12.747 | 4.0 | 0.314 | 58.321 | 6.382 | 9.138 |
| 7 | 12.791 | 4.0 | 0.313 | 60.389 | 6.511 | 9.275 |
| 8 | 12.677 | 4.0 | 0.316 | 63.204 | 6.467 | 9.773 |
| 9 | 11.979 | 4.0 | 0.334 | 63.504 | 6.114 | 10.387 |
| 10 | 11.855 | 4.0 | 0.337 | 61.885 | 6.021 | 10.278 |
| 11 | 11.169 | 4.0 | 0.358 | 51.621 | 5.742 | 8.990 |
| 12 | 12.241 | 4.0 | 0.327 | 67.766 | 6.402 | 10.585 |
| 13 | 12.002 | 4.0 | 0.333 | 62.727 | 6.226 | 10.075 |
| 14 | 11.249 | 4.0 | 0.356 | 58.488 | 5.976 | 9.787 |
| 15 | 11.769 | 4.0 | 0.340 | 65.489 | 6.277 | 10.433 |
| 16 | 11.886 | 4.0 | 0.337 | 65.982 | 6.295 | 10.482 |
| 17 | 10.929 | 4.0 | 0.366 | 59.595 | 5.944 | 10.026 |
| 18 | 11.433 | 2.5 | 0.219 | 54.841 | 5.753 | 9.533 |
| 19 | 11.221 | 2.5 | 0.223 | 63.518 | 7.124 | 8.916 |
| 20 | 11.626 | 2.5 | 0.215 | 43.110 | 4.778 | 9.023 |

$L_{12}$: Inter-plane distance between the first group lens and the second group lens
$L_{23}$: Inter-plane distance between the second group lens and the third group lens
$L_{34}$: Inter-plane distance between the third group lens and the fourth group lens
$A_8$: Aspherical space/Spherical space of the lens surface for the fourth group lens on the image generation source side Glass is employed for the third group lens 3 in order to reduce a drift in the focusing performance due to a change in the temperature, and as high a positive refracting power as possible is designated. In addition, for this embodiment, SK5 (product name for glass, by SCHOTT Co., Ltd.), which is an inexpensive optical glass, is employed in order to reduce the manufacturing costs for a projection lens.

The fourth group lens 4 has a center portion having a concave shape toward the screen, and employs the lens peripheral concave portion on the screen side to correct the spherical aberration for an image light flux (upper limit light RAY 1, lower limit light RAY 2) from an object light A along the axis. In this embodiment, for example, as is apparent from Table 1, the fourth group lens 4, as well as the other aspherical lens, is formed of a low dispersing material (e.g., PMMA) having a refractive index of about 1.49 and an Abbe number of 57 or greater. Since PMMA has superior flowability and forming can be easily performed, the aspherical space in the peripheral portion can be easily increased by forming the fourth group lens 4 using this material. Therefore, as is shown in Table 23, the relationship of the aspherical surface ratio $A_8$ (=$A_{s8}/S_{s8}$) of the peripheral portion and the inter-plane distance $L_{34}$ can fall within the range shown in expression 3 below.

$$5.31 < A_8/L_{34} < 12.57 \quad \text{(Expression 3)}$$

Further, the fourth group lens 4 of this invention has a concave meniscus shape toward the screen. The lens surface $S_7$ on the screen side is aspherical, so that the curvature is gradually increased from the light axis toward a predetermined point located between the light axis and the outer edge, and is gradually reduced from the predetermined point toward the outer edge. That is, in a predetermined area including this predetermined point, the concave shape (i.e., the angle of the bend) is sharpened by increasing the curvature, so it is greater than in the center portion, which includes the light axis, while the bend is reduced (i.e., moderated) by reducing the curvature from the predetermined area to the outer edge. As is described above, for the lens surface of the fourth group lens 4 of the invention on the screen side, the outer edge is so shaped that it is returned to the projection tube 17, which is the image generation source, and is not projected to the third group lens 3. Therefore, the assembly process (when lenses are assembled in the lens barrel 9) can be easily performed without the third group lens 3 and the fourth group lens 4 physically interfering with each other in the center portion, which includes the light axis, and in the peripheral portion, which includes the outer edges. In this embodiment, when ½ of the effective diameter of the lens is a relative radius of 1.0, the predetermined point described above should be present in a range of about 0.90 to 0.95. That is, in this embodiment, the curvature is increased, within the range of the relative radius of 0.90 to 0.95, from the light axis (a relative radius of 0) and is reduced toward the relative radius of 1.0 (the outer edge). Table 34 shows specific numerical values for the predetermined points of the fourth group lens 4 in the individual examples shown in Tables 1 to 20. The predetermined points in Table 34 are those whereat the inclinations are the minimum for the curves (the lens shapes) that are obtained by substituting the lens data in Tables 1 to 20 into expression 1, described above.

TABLE 34

| Lens No. | Predetermined Point Position (Relative Radius) |
| --- | --- |
| 1 | 0.935 |
| 2 | 0.930 |
| 3 | 0.930 |
| 4 | 0.919 |
| 5 | 0.918 |
| 6 | 0.921 |
| 7 | 0.920 |
| 8 | 0.926 |
| 9 | 0.944 |
| 10 | 0.943 |
| 11 | 0.938 |
| 12 | 0.941 |
| 13 | 0.939 |
| 14 | 0.936 |
| 15 | 0.943 |
| 16 | 0.939 |
| 17 | 0.944 |
| 18 | 0.927 |
| 19 | 0.938 |
| 20 | 0.905 |

Further, for the fourth group lens 4 of the invention, since the aspherical space ($S_{38}$-$A_{38}$) of the peripheral portion, including the outer edge of the lens surface on the screen side, is increased, power can be provided for the peripheral portion that includes the outer edge. Therefore, the directions at which light enters the third group lens 3 at the individual view angles can be adjusted, and chromatic aberration can be reduced. Further, since power is provided for the peripheral portion, an optical action that inwardly (the light axial direction) faces the image light passed through the fourth group lens 4 is strengthened. Thus, an increase in the incidence angle at which the image light enters the incidence surface ($S_6$) of the third group lens 3 is suppressed, the overlapping of light beams that enter the third group lens 3 seldom occurs at individual angles of view, and the occurrence of aberrations can be prevented. Therefore, when the third group lens 3 and the fourth group lens 4 are so located they are separated by a long distance, aberrations can be appropriately corrected. In other words, with the structure of the fourth group lens 4, the interval between the third group lens 3 and the fourth group lens 4 can be extended while an increase in the aberrations can be suppressed. In this embodiment, as is shown in Tables 1 to 20, the inter-plane distance between the third group lens 3 and the fourth group lens 4 is about 4.77 to 7.13 mm. So long as the inter-plane distance is at least 4.0 mm or greater, the above described physical interference can be easily avoided during the assembly process, and the productivity can effectively be increased.

Moreover, as is described above, since an inexpensive low dispersal material (e.g., PMMA) having a refractive index of about 1.49 and an Abbe number of 57 or greater is employed as the plastic material for the fourth group lens 4, compared with when polycarbonate, for example, is employed as the plastic material, costs can be reduced.

As is shown in FIGS. 2, 3, and 4, the fifth group lens 5 corrects a high-order comatic aberration that occurs for an image light flux (upper limit light RAY 3, lower limit light RAY 4) originating at the object point B in the screen peripheral portion. Therefore, for the area wherein the upper limit light RAY 3 passes through, as is shown in Table 32, the following range is defined for the aspherical surface ratio $A_{S10}/S_{S10}$ ($=A_{10}$) in the vicinity of the place whereat the lower limit light RAY 4 passes through, so that the insufficient refracting power of the fourth group lens 4 is compensated for.

$$0.55 \leq A_{S10}/S_{10} \leq -0.03 \quad \text{(Expression 4)}$$

Further, since the concave shape at the peripheral portion of the lens surface $S_{10}$ is moderated, the interval from the edge of the sixth group lens 6 is obtained. With this arrangement, during a focusing adjustment process, the lenses can be moved long distances, as far as possible, to extend the effective screen size (45 to 75 inches). In this embodiment, with this structure, as is shown in Table 24, the relation in expression 5 below is established by the distance $L_{01}$ (mm) between the lens surface of the first group lens 1, which is near the screen, and the rear projection screen, and by the effective diagonal length M (inches) of the screen.

$$17.0 < (L/M) < 17.4 \quad \text{(Expression 5)}$$

It should be noted that in Table 24 the inter-plane distance $L_{01}$ and the effective diagonal length M having the subscript 45 are for effective minimum screen sizes of 45 inches, and the inter-plane distance $L_{01}$ and the effective diagonal length M having subscript 75 are for effective maximum screen sizes of 75 inches.

TABLE 24

| Lens No. | $L_{01(45)}$ | $M_{45}$ | $L_{01(45)}/M_{45}$ | $L_{01(75)}$ | $M_{75}$ | $L_{01(45)}/M_{45}$ |
| --- | --- | --- | --- | --- | --- | --- |
| 1 | 765 | 45 | 17.00 | 1303 | 75 | 17.37 |
| 2 | 765.5 | 45 | 17.01 | 1302 | 75 | 17.36 |
| 3 | 766 | 45 | 17.02 | 1302 | 75 | 17.36 |
| 4 | 766 | 45 | 17.02 | 1302 | 75 | 17.36 |
| 5 | 766 | 45 | 17.02 | 1303 | 75 | 17.37 |

TABLE 24-continued

| Lens No. | $L_{o1(45)}$ | $M_{45}$ | $L_{o1(45)}/M_{45}$ | $L_{o1(75)}$ | $M_{75}$ | $L_{o1(45)}/M_{45}$ |
|---|---|---|---|---|---|---|
| 6 | 766 | 45 | 17.02 | 1303 | 75 | 17.37 |
| 7 | 765 | 45 | 17.00 | 1303 | 75 | 17.37 |
| 8 | 764.5 | 45 | 16.99 | 1303 | 75 | 17.37 |
| 9 | 765 | 45 | 17.00 | 1303 | 75 | 17.37 |
| 10 | 765 | 45 | 17.00 | 1303 | 75 | 17.37 |
| 11 | 765 | 45 | 17.00 | 1303 | 75 | 17.37 |
| 12 | 765 | 45 | 17.00 | 1302 | 75 | 17.36 |
| 13 | 765 | 45 | 17.00 | 1302 | 75 | 17.36 |
| 14 | 765 | 45 | 17.00 | 1303 | 75 | 17.37 |
| 15 | 765 | 45 | 17.00 | 1303 | 75 | 17.37 |
| 16 | 765 | 45 | 17.00 | 1303 | 75 | 17.37 |
| 17 | 766 | 45 | 17.02 | 1303 | 75 | 17.37 |
| 18 | 766 | 45 | 17.02 | 1303 | 75 | 17.37 |
| 19 | 766 | 45 | 17.02 | 1303 | 75 | 17.37 |
| 20 | 766 | 45 | 17.02 | 1303 | 75 | 17.37 |

$L_{o1(45)}$: distance (mm), on the effective minimum screen, from the first group lens on the screen side to the rear projection screen
$L_{o1(75)}$: distance (mm), on the effective maximum screen, from the first group lens on the screen side to the rear projection screen
$M_{45}$: effective minimum screen size (45 inches)
$M_{75}$: effective maximum screen size (75 inches)

The sixth group lens 6, together with the projection tube fluorescent plane $P_1$, corrects field curvature. Since the projection tube fluorescent plane $P_1$ is spherical, as is shown in FIGS. 2, 3 and 4, the refracting power of the aspherical lens surface $S_{11}$ of the sixth group lens 6 on the screen side, where the image light flux (upper limit light RAY 3, lower limit light RAY 4) originates at the object point B, is reduced, compared with that in the vicinity of the light axis, and also, at the same time, astigmatism correction is performed.

Figure 6:
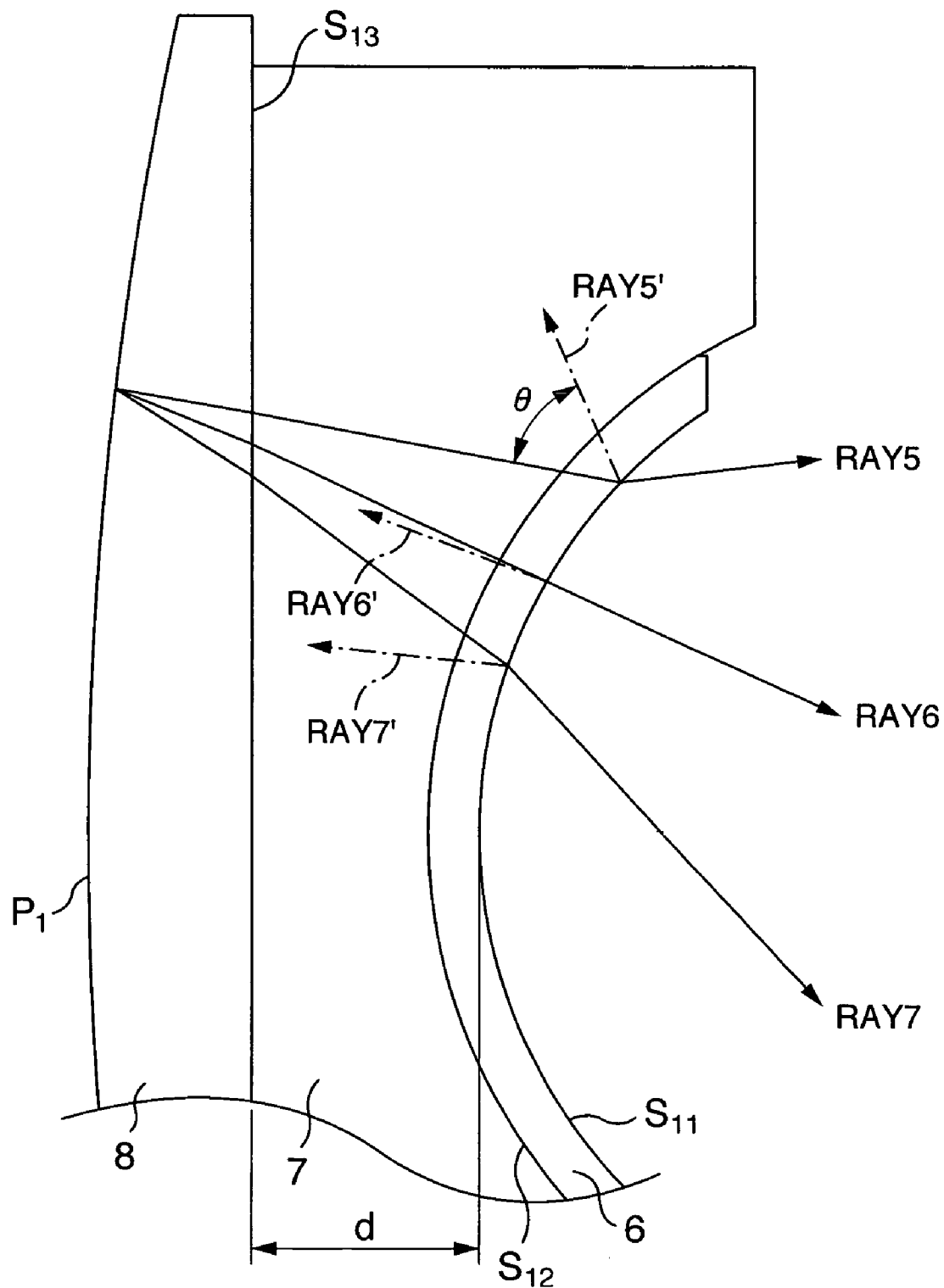
FIG. 6 is a diagram for explaining an improvement in contrast.

The factors contributing to the deterioration of contrast will now be described while referring to FIG. 6. FIG. 6 is a diagram of a detail of the structure shown in FIG. 1, covering the area from the projection tube to the sixth group lens. In FIG. 6, the sixth group lens 6 is fixed to the bracket 11 at a location at the distance d. The same symbols and numbers as are used in FIG. 1 are provided for the corresponding portions to avoid an explanation of them.

In this structure, as is shown in FIG. 6, light beams RAY5, RAY6 and RAY7, from points for the original image that is projected onto the projection tube (Braun tube) fluorescent plane $P_1$, are reflected by the emittance surface $S_{11}$ of the sixth group lens 6. Reflected light beams RAY5', RAY6' and RAY7' are returned to the low luminance portions of the original image that is projected onto the projection tube (Braun tube) fluorescent plane $P_1$ and reduce the contrast. The contrast is represented as a ratio of the high luminance portions and the low luminance portions of the original image projected onto the projection tube (Braun tube) fluorescent plane $P_1$. As the energy of the reflected beams RAY5', RAY6' and RAY7' is high, the luminance level of the low luminance portions is increased and the contrast is reduced. The reflected light returned to the low luminance portions depends on the distance d and the focal distance of the sixth group lens 6. As the focal distance is short, the shape of the sixth group lens 6 is bent, and accordingly, a reflection angle θ is increased. That is, in accordance with a balance between the distance d and the reflection angle, the return width of the reflected light is adjusted to obtain the optimal return width.

That is, as is shown in Table 22, expression 6 is established by the distance d, between the emittance surface $S_{13}$ of the projection tube panel 8 and the lens surface $S_{11}$ of the sixth group lens 6 on the screen side, and the focal distance $f_6$ of the sixth group lens 6. As a result, the contrast can be increased.

It should be noted that, as the results of an evaluation made through the mounting of the sets of lenses, the contrast of the conventional lens was 100 (1.0), and the contrast of the lens of this invention was 109 (1.1) and could be increased by about 10%.

$$-7.62 < f_6/d < -5.86 \quad \text{(Expression 6)}$$

TABLE 22

| Lens No. | $f_6$ | d | $f_6/d$ |
|---|---|---|---|
| 1 | −127.435 | 18.1 | −7.041 |
| 2 | −128.362 | 18.1 | −7.092 |
| 3 | −128.729 | 18.1 | −7.112 |
| 4 | −129.784 | 18.1 | −7.170 |
| 5 | −130.872 | 18.1 | −7.230 |
| 6 | −131.58 | 18.1 | −7.270 |
| 7 | −132.343 | 18.1 | −7.312 |
| 8 | −130.701 | 18.1 | −7.221 |
| 9 | −129.573 | 18.1 | −7.159 |
| 10 | −127.724 | 18.1 | −7.057 |
| 11 | −126.222 | 18.1 | −6.974 |
| 12 | −129.721 | 18.1 | −7.167 |
| 13 | −129.294 | 18.1 | −7.143 |
| 14 | −127.817 | 18.1 | −7.062 |
| 15 | −127.649 | 18.1 | −7.052 |
| 16 | −126.838 | 18.1 | −7.008 |
| 17 | −124.694 | 17.3 | −7.208 |
| 18 | −125.994 | 19.1 | −6.597 |
| 19 | −121.914 | 16.0 | −7.620 |
| 20 | −128.402 | 21.9 | −5.863 |

$f_6$: focal distance (mm) of the sixth group lens
d: distance from the emittance surface of the image generation source to the lens surface of the sixth group lens on the screen side
$A_8$: aspherical space/spherical space of the lens surface of the fourth group lens on the image generation source side Furthermore, in addition to the increase in the contrast, for the sixth group lens 6, a wavelength selection filter may be provided that absorbs a wavelength other than the main wavelengths of the beams RAY5, RAY6 and RAY7 from the points on the original image that is projected onto the projection tube (Braun tube) fluorescent plane $P_1$. With this filter, spectrum elements not required for the image quality can be absorbed and the intensities of the reflected beams RAY5', RAY6' and RAY7' can be effectively reduced, and in addition, the occurrence of a chromatic aberration can be suppressed. Of course, the wavelength selection filter function may be provided for the coolant 7, or for both the sixth group lens 6 and the coolant 7.

Figure 9:
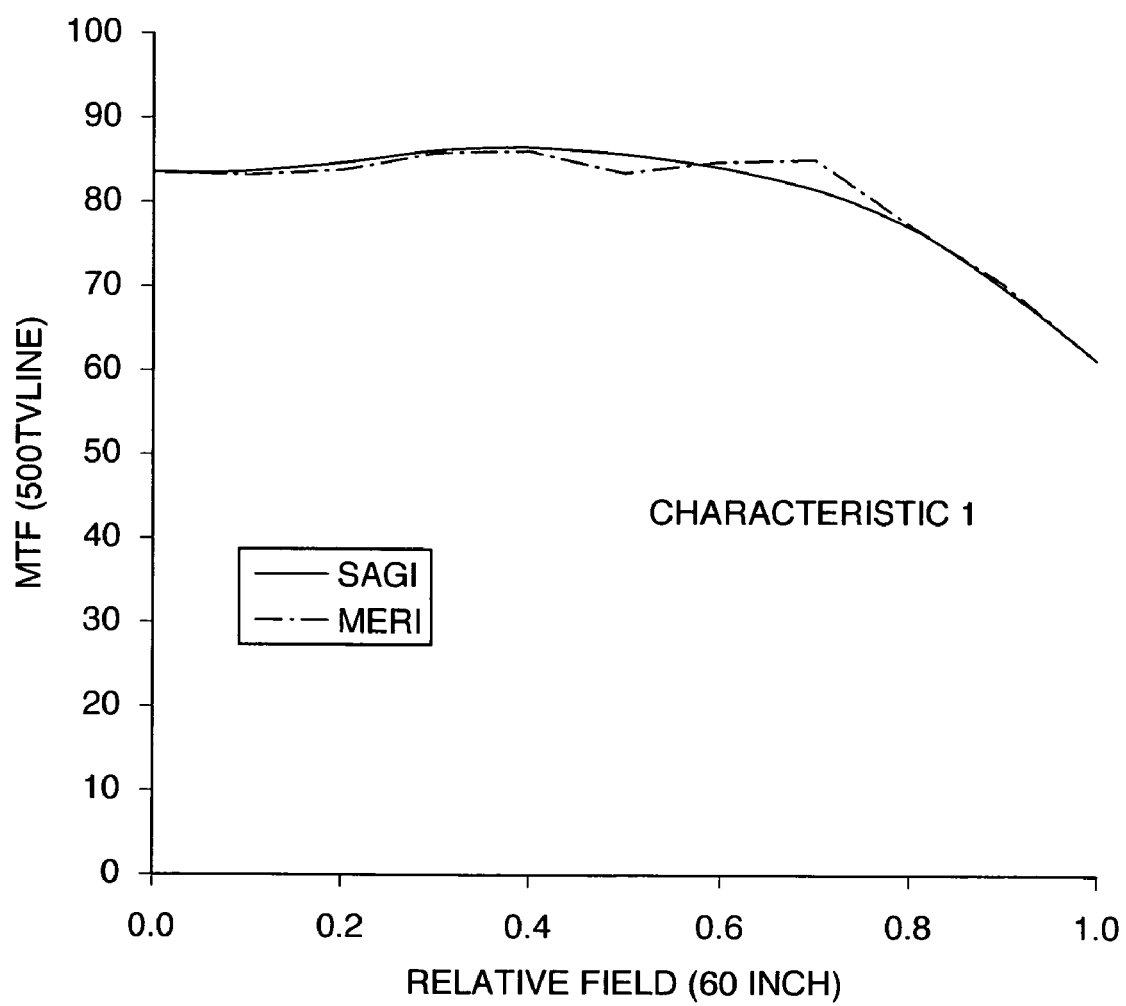
FIG. 9 is an MTF characteristic graph for a projection lens apparatus in Table 1 shown as the embodiment of the present invention.
Figure 10:
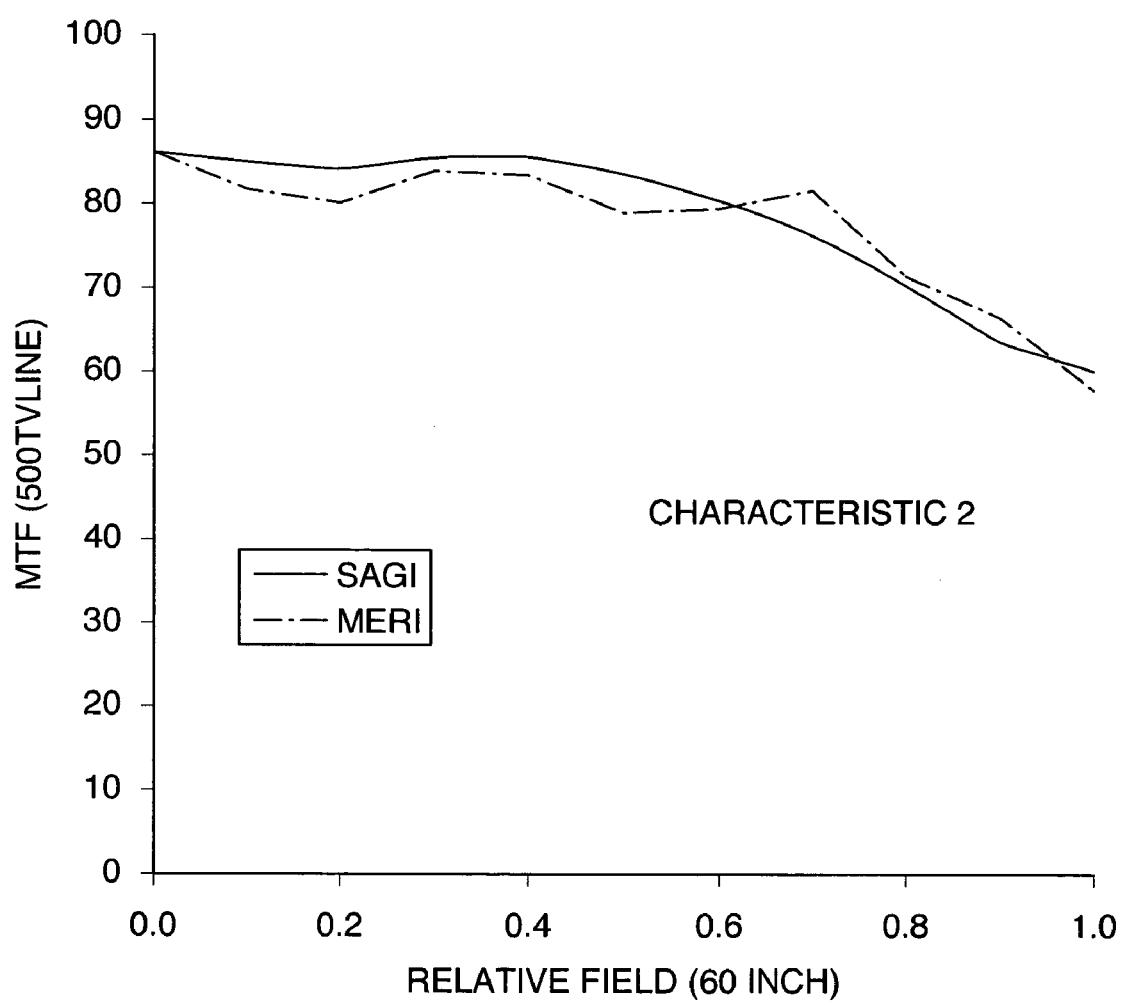
FIG. 10 is an MTF characteristic graph for the projection lens apparatus in Table 2 shown as the embodiment of the present invention.

In FIGS. 9 to 11 are shown evaluation results obtained for the focusing performed by the MTF (Modulation Transfer Function) when a 5.2 inch raster image WAS projected onto the projection tube fluorescent plane by the projection lens apparatus of the thus described invention, and was enlarged and projected onto the screen (60 inches).

FIG. 9 is a characteristic graph corresponding to Table 1, FIG. 10 is a characteristic graph corresponding to Table 2, and FIG. 11 is a characteristic graph corresponding to Table 3. It should be noted that the evaluation frequency indicated is for 500 black TV stripe signals. In order to obtain a high contrast performance, not only must a MTF value be high, but also, for the individual viewing angles, SAGI and MERI values must be similar. As is shown in FIGS. 9 to 11, according to this structure, a difference in the MTF values obtained in the SAGI and MERI directions was equal to or less than 10% for 500 TV signals, and a satisfactory MTF characteristic was obtained.

For the embodiment shown in Tables 1 to 20, when the focal distance of the entire projection lens apparatus is denoted by $f_0$, and the focal distances of the first lens group 1, the second lens group, the third lens group, the fourth lens group, the fifth lens group and the sixth lens group are denoted by $f_1$, $f_2$, $f_3$, $f_4$, $f_5$ and $f_6$, the relation in expression 7 below is established, as is apparent from Table 21, which represents the distribution of lens power.

$$0.29 < f_0/f_1 < 0.33$$

$$0.00 < f_0/f_2 < 0.01$$

$$0.81 < f_0/f_3 < 0.83$$

$$-0.09 < f_0/f_4 < -0.04$$

$$0.25 < f_0/f_5 < 0.30$$

$$-0.70 < f_0/f_6 < -0.64 \qquad \text{(Expression 7)}$$

TABLE 21

| Lens No. | Lens Power Distribution | | | | | |
|---|---|---|---|---|---|---|
| | $f_0/f_1$ | $f_0/f_2$ | $f_0/f_3$ | $f_0/f_4$ | $f_0/f_5$ | $f_0/f_6$ |
| 1 | 0.320 | 0.003 | 0.821 | −0.072 | 0.261 | −0.669 |
| 2 | 0.297 | 0.003 | 0.833 | −0.078 | 0.280 | −0.665 |
| 3 | 0.293 | 0.003 | 0.832 | −0.074 | 0.278 | −0.662 |
| 4 | 0.292 | 0.003 | 0.825 | −0.071 | 0.279 | −0.651 |
| 5 | 0.312 | 0.003 | 0.824 | −0.088 | 0.278 | −0.645 |
| 6 | 0.309 | 0.003 | 0.822 | −0.088 | 0.282 | −0.640 |
| 7 | 0.310 | 0.003 | 0.824 | −0.091 | 0.281 | −0.637 |
| 8 | 0.302 | 0.003 | 0.816 | −0.074 | 0.283 | −0.646 |
| 9 | 0.300 | 0.003 | 0.812 | −0.049 | 0.269 | −0.659 |
| 10 | 0.307 | 0.003 | 0.813 | −0.060 | 0.276 | −0.668 |
| 11 | 0.330 | 0.003 | 0.819 | −0.088 | 0.278 | −0.676 |
| 12 | 0.288 | 0.003 | 0.813 | −0.042 | 0.271 | −0.656 |
| 13 | 0.302 | 0.003 | 0.821 | −0.064 | 0.268 | −0.659 |
| 14 | 0.319 | 0.003 | 0.821 | −0.072 | 0.261 | −0.667 |
| 15 | 0.292 | 0.003 | 0.820 | −0.052 | 0.271 | −0.668 |
| 16 | 0.289 | 0.003 | 0.821 | −0.051 | 0.272 | −0.672 |
| 17 | 0.315 | 0.003 | 0.820 | −0.067 | 0.258 | −0.683 |
| 18 | 0.310 | 0.003 | 0.821 | −0.064 | 0.275 | −0.677 |
| 19 | 0.290 | 0.008 | 0.817 | −0.051 | 0.248 | −0.697 |
| 20 | 0.325 | 0.003 | 0.823 | −0.075 | 0.303 | −0.666 |

$f_0$: focal distance (mm) of entire lens system
$f_1$: focal distance (mm) of first group lens
$f_2$: focal distance (mm) of second group lens
$f_3$: focal distance (mm) of third group lens
$f_4$: focal distance (mm) of fourth group lens
$f_5$: focal distance (mm) of fifth group lens
$f_6$: focal distance (mm) of sixth group lens In this embodiment, the largest part of the positive refracting power of the entire projection lens apparatus is allocated to the third group lens 3, which is a glass lens, the temperature drift of the focusing performance is reduced. Further, since a low refraction material is employed for the fourth group lens 4, the lack of power is compensated for by the refracting power of the fifth lens.

The shapes of the lens surfaces (aspherical shapes) of the first group lens 1, the second group lens 2, the fourth group lens 4, the fifth group lens 5 and the sixth group lens 6, which are aspherical plastic lens that are relied on for aberration correction, will now be described while referring to FIGS. 7 and 8. According to this invention, as is apparent from Tables 1 to 20, the aspherical plastic lenses, when formed, have fourteen or more aspherical surfaces.

As is described above, in FIG. 8, the height (the amount of sag) of the lens surface is shown when the Z axis represents the light axial direction from the screen to the image generation source, and the r axis represents the radial direction of the lens. Assume S(r) in the spherical type case, i.e., only Rd, and assume As(r) when the aspherical coefficients, such as K, A, B, C, D and F, are substituted into expression 1. When the value of the effective radius of the lens is substituted into r, an aspherical surface ratio representing the aspherical level can be obtained (the degree is represented by the absolute value of As/S, and the direction is represented by symbol ±).

Tables 25 to 33 show the aspherical ratio and the number of inflection points on the lens surfaces of the individual aspherical lenses. Table 25 relates to the lens surface S1 of the first group lens 1; Table 26 relates to the lens surface S2 of the first group lens 1; Table 27 relates to the lens surface S3 of the second group lens 2; Table 28 relates to the lens surface S4 of the second group lens 2; Table 29 relates to the lens surface S7 of the fourth group lens 4; Table 30 relates to the lens surface S8 of the fourth group lens 4; Table 31 relates to the lens surface S9 of the fifth group lens 5; Table 32 relates to the lens surface S10 of the fifth group lens 5; and Table 33 relates to the lens surface S11 of the sixth group lens 6.

TABLE 25

$S_1$

| Lens No. | Number Of Inflection Points (In Effective Radius) | $A_{s1}$ (mm) | $S_{S1}$ (mm) | $A_{s1}/S_{s1}$ | Effective Radius (mm) |
|---|---|---|---|---|---|
| 1 | 1 | 3.976 | 14.672 | 0.271 | 46.59 |
| 2 | 1 | 4.611 | 15.544 | 0.297 | 47.50 |
| 3 | 1 | 4.467 | 15.147 | 0.295 | 47.41 |
| 4 | 1 | 4.693 | 15.560 | 0.302 | 47.26 |
| 5 | 1 | 4.730 | 16.102 | 0.294 | 47.22 |
| 6 | 1 | 4.832 | 16.223 | 0.298 | 47.21 |
| 7 | 1 | 4.630 | 16.260 | 0.285 | 47.32 |
| 8 | 1 | 4.819 | 15.989 | 0.301 | 47.33 |
| 9 | 1 | 4.228 | 15.510 | 0.273 | 47.35 |
| 10 | 1 | 4.555 | 15.258 | 0.299 | 47.08 |
| 11 | 1 | 4.537 | 14.792 | 0.307 | 46.69 |
| 12 | 1 | 4.362 | 15.678 | 0.278 | 47.44 |
| 13 | 1 | 4.231 | 15.308 | 0.276 | 47.04 |
| 14 | 1 | 3.984 | 14.769 | 0.270 | 46.63 |
| 15 | 1 | 4.217 | 15.336 | 0.275 | 47.02 |
| 16 | 1 | 4.241 | 15.342 | 0.276 | 47.14 |
| 17 | 1 | 4.009 | 14.780 | 0.271 | 46.43 |
| 18 | 1 | 4.236 | 15.060 | 0.281 | 46.49 |
| 19 | 1 | 3.272 | 14.265 | 0.229 | 46.11 |
| 20 | 1 | 5.333 | 16.302 | 0.327 | 47.56 |

TABLE 26

$S_2$

| Lens No. | Number Of Inflection Points (In Effective Radius) | $A_{s2}$ (mm) | $S_{S2}$ (mm) | $A_{s2}/S_{s2}$ | Effective Radius (mm) |
|---|---|---|---|---|---|
| 1 | 0 | 4.878 | 6.283 | 0.776 | 43.65 |
| 2 | 0 | 5.508 | 7.441 | 0.740 | 44.11 |
| 3 | 0 | 5.504 | 7.229 | 0.761 | 43.98 |
| 4 | 0 | 5.687 | 7.526 | 0.756 | 43.96 |
| 5 | 0 | 5.093 | 7.326 | 0.695 | 44.25 |
| 6 | 0 | 5.266 | 7.497 | 0.702 | 44.22 |
| 7 | 0 | 5.057 | 7.477 | 0.676 | 44.40 |
| 8 | 0 | 5.449 | 7.535 | 0.723 | 44.16 |
| 9 | 0 | 5.163 | 7.328 | 0.704 | 44.11 |
| 10 | 0 | 5.414 | 7.044 | 0.769 | 43.80 |
| 11 | 0 | 5.286 | 6.150 | 0.860 | 43.61 |
| 12 | 0 | 5.437 | 7.767 | 0.700 | 44.07 |
| 13 | 0 | 5.111 | 7.143 | 0.716 | 43.93 |
| 14 | 0 | 4.865 | 6.373 | 0.763 | 43.69 |
| 15 | 0 | 5.335 | 7.508 | 0.711 | 43.69 |
| 16 | 0 | 5.416 | 7.586 | 0.714 | 43.73 |
| 17 | 0 | 4.954 | 6.503 | 0.762 | 43.55 |

TABLE 26-continued $S_2$

| Lens No. | Number Of Inflection Points (In Effective Radius) | $A_{s2}$ (mm) | $S_{S2}$ (mm) | $A_{s2}/S_{s2}$ | Effective Radius (mm) |
|---|---|---|---|---|---|
| 18 | 0 | 5.396 | 6.874 | 0.785 | 43.50 |
| 19 | 0 | 4.433 | 6.766 | 0.655 | 43.28 |
| 20 | 0 | 6.524 | 7.329 | 0.890 | 43.99 |

TABLE 27

$S_3$

| Lens. No. | Number Of Inflection Points (In Effective Radius) | $A_{s3}$ (mm) | $S_{S3}$ (mm) | $A_{s3}/S_{s3}$ | Effective Radius (mm) |
|---|---|---|---|---|---|
| 1 | 1 | 5.812 | −4.588 | −1.267 | 43.13 |
| 2 | 1 | 5.677 | −4.631 | −1.226 | 43.33 |
| 3 | 1 | 5.873 | −4.600 | −1.277 | 43.18 |
| 4 | 1 | 5.818 | −4.625 | −1.258 | 43.30 |
| 5 | 1 | 5.808 | −4.604 | −1.262 | 43.20 |
| 6 | 1 | 5.787 | −4.625 | −1.251 | 43.30 |
| 7 | 1 | 5.782 | −4.638 | −1.247 | 43.36 |
| 8 | 1 | 5.773 | −4.615 | −1.251 | 43.25 |
| 9 | 1 | 5.830 | −4.625 | −1.261 | 43.30 |
| 10 | 1 | 5.759 | −4.584 | −1.256 | 43.11 |
| 11 | 1 | 5.759 | −4.584 | −1.256 | 43.11 |
| 12 | 1 | 5.814 | −4.596 | −1.265 | 43.16 |
| 13 | 1 | 5.807 | −4.592 | −1.265 | 43.15 |
| 14 | 1 | 5.816 | −4.591 | −1.267 | 43.14 |
| 15 | 1 | 5.862 | −4.539 | −1.291 | 42.90 |
| 16 | 1 | 5.884 | −4.536 | −1.297 | 42.89 |
| 17 | 1 | 5.783 | −4.566 | −1.267 | 43.03 |
| 18 | 1 | 5.873 | −4.615 | −1.273 | 43.25 |
| 19 | 1 | 5.787 | −4.567 | −1.267 | 43.03 |
| 20 | 1 | 5.561 | −4.753 | −1.170 | 43.89 |

TABLE 28

$S_4$

| Lens No. | Number Of Inflection Points (In Effective Radius) | $A_{s4}$ (mm) | $S_{S4}$ (mm) | $A_{s4}/S_{s4}$ | Effective Radius (mm) |
|---|---|---|---|---|---|
| 1 | 2 | 0.549 | −28.901 | −0.019 | 42.63 |
| 2 | 2 | 0.446 | −29.550 | −0.015 | 43.06 |
| 3 | 2 | 0.633 | −28.809 | −0.022 | 42.83 |
| 4 | 2 | 0.597 | −28.318 | −0.021 | 42.82 |
| 5 | 2 | 0.586 | −27.418 | −0.021 | 42.61 |
| 6 | 2 | 0.568 | −27.215 | −0.021 | 42.64 |
| 7 | 2 | 0.552 | −26.951 | −0.020 | 42.65 |
| 8 | 2 | 0.554 | −27.530 | −0.020 | 42.63 |
| 9 | 2 | 0.582 | −28.350 | −0.021 | 42.79 |
| 10 | 2 | 0.578 | −28.971 | −0.020 | 42.71 |
| 11 | 2 | 0.567 | −29.706 | −0.019 | 42.71 |
| 12 | 2 | 0.580 | −27.896 | −0.021 | 42.63 |
| 13 | 2 | 0.565 | −28.009 | −0.020 | 42.60 |
| 14 | 2 | 0.554 | −28.739 | −0.019 | 42.64 |
| 15 | 2 | 0.637 | −28.155 | −0.023 | 42.36 |
| 16 | 2 | 0.658 | −28.063 | −0.023 | 42.38 |
| 17 | 2 | 0.535 | −30.113 | −0.018 | 42.59 |
| 18 | 2 | 0.606 | −30.454 | −0.020 | 42.90 |
| 19 | 2 | 0.569 | −32.517 | −0.017 | 42.83 |
| 20 | 2 | 0.253 | −31.323 | −0.008 | 43.71 |

TABLE 29

$S_7$

| Lens No. | Number Of Inflection Points (In Effective Radius) | $A_{s7}$ (mm) | $S_{S7}$ (mm) | $A_{s7}/S_{s7}$ | Effective Radius (mm) |
|---|---|---|---|---|---|
| 1 | 0 | −2.800 | −1.297 | 2.159 | 37.76 |
| 2 | 0 | −3.688 | −1.544 | 2.389 | 38.38 |
| 3 | 0 | −3.554 | −1.364 | 2.605 | 38.19 |
| 4 | 0 | −3.071 | −1.293 | 2.376 | 37.76 |
| 5 | 0 | −3.073 | −1.557 | 1.973 | 37.46 |
| 6 | 0 | −3.195 | −1.568 | 2.038 | 37.47 |
| 7 | 0 | −3.322 | −1.610 | 2.063 | 37.52 |
| 8 | 0 | −3.273 | −1.344 | 2.436 | 37.69 |
| 9 | 0 | −2.905 | −0.902 | 3.221 | 37.71 |
| 10 | 0 | −2.823 | −1.094 | 2.581 | 37.74 |
| 11 | 0 | −2.583 | −1.568 | 1.647 | 37.73 |
| 12 | 0 | −3.182 | −0.790 | 4.025 | 37.72 |
| 13 | 0 | −3.027 | −1.143 | 2.649 | 37.60 |
| 14 | 0 | −2.805 | −1.289 | 2.176 | 37.73 |
| 15 | 0 | −3.065 | −0.952 | 3.218 | 37.55 |
| 16 | 0 | −3.085 | −0.937 | 3.292 | 37.57 |
| 17 | 0 | −2.763 | −1.230 | 2.247 | 38.04 |
| 18 | 0 | −2.608 | −1.177 | 2.216 | 37.96 |
| 19 | 0 | −2.929 | −0.983 | 2.978 | 38.58 |
| 20 | 0 | −1.743 | −1.335 | 1.305 | 37.68 |

TABLE 30

$S_8$

| Lens No. | Number Of Inflection Points (In Effective Radius) | $A_{s8}$ (mm) | $S_{S8}$ (mm) | $A_{s8}/S_{s8}$ | Effective Radius (mm) |
|---|---|---|---|---|---|
| 1 | 2 | −4.116 | −0.070 | 58.604 | 37.48 |
| 2 | 0 | −4.864 | −0.172 | 28.277 | 38.17 |
| 3 | 2 | −4.712 | −0.072 | 65.475 | 37.94 |
| 4 | 2 | −4.276 | −0.071 | 60.203 | 37.69 |
| 5 | 2 | −3.939 | −0.070 | 56.404 | 37.37 |
| 6 | 2 | −4.083 | −0.070 | 58.321 | 37.42 |
| 7 | 2 | −4.236 | −0.070 | 60.389 | 37.45 |
| 8 | 2 | −4.479 | −0.071 | 63.204 | 37.65 |
| 9 | 2 | −4.518 | −0.071 | 63.504 | 37.72 |
| 10 | 2 | −4.395 | −0.071 | 61.885 | 37.69 |
| 11 | 2 | −3.606 | −0.070 | 51.621 | 37.38 |
| 12 | 0 | −4.826 | −0.071 | 67.766 | 37.74 |
| 13 | 2 | −4.432 | −0.071 | 62.727 | 37.59 |
| 14 | 2 | −4.103 | −0.070 | 58.488 | 37.46 |
| 15 | 2 | −4.622 | −0.071 | 65.489 | 37.57 |
| 16 | 2 | −4.660 | −0.071 | 65.982 | 37.58 |
| 17 | 2 | −4.247 | −0.071 | 59.595 | 37.75 |
| 18 | 2 | −3.870 | −0.071 | 54.841 | 37.13 |
| 19 | 2 | −4.619 | −0.073 | 63.518 | 38.14 |
| 20 | 2 | −2.851 | −0.066 | 43.110 | 36.37 |

TABLE 31

$S_9$

| Lens No. | Number Of Inflection Points (In Effective Radius) | $A_{s9}$ (mm) | $S_{s9}$ (mm) | $A_{s9}/S_{s9}$ | Effective Radius (mm) |
|---|---|---|---|---|---|
| 1 | 1 | 0.241 | 0.066 | 3.673 | 36.25 |
| 2 | 1 | 0.326 | 0.068 | 4.813 | 36.80 |
| 3 | 1 | 0.320 | 0.067 | 4.773 | 36.62 |
| 4 | 1 | 0.382 | 0.067 | 5.678 | 36.70 |
| 5 | 1 | −0.024 | 0.067 | −0.360 | 36.55 |
| 6 | 1 | 0.220 | 0.067 | 3.301 | 36.54 |
| 7 | 1 | 0.211 | 0.067 | 3.161 | 36.50 |
| 8 | 1 | 0.211 | 0.067 | 3.153 | 36.62 |
| 9 | 1 | 0.239 | 0.067 | 3.589 | 36.51 |
| 10 | 1 | 0.248 | 0.067 | 3.714 | 36.52 |
| 11 | 1 | 0.246 | 0.066 | 3.729 | 36.33 |
| 12 | 1 | 0.229 | 0.067 | 3.418 | 36.59 |
| 13 | 1 | 0.232 | 0.066 | 3.492 | 36.44 |
| 14 | 1 | 0.241 | 0.066 | 3.672 | 36.24 |
| 15 | 1 | 0.237 | 0.066 | 3.568 | 36.42 |
| 16 | 1 | 0.229 | 0.066 | 3.450 | 36.45 |
| 17 | 1 | 0.227 | 0.066 | 3.417 | 36.41 |
| 18 | 1 | 0.267 | 0.064 | 4.156 | 35.85 |
| 19 | 1 | 0.061 | 0.067 | 0.909 | 36.59 |
| 20 | 1 | 0.141 | 0.062 | 2.291 | 35.08 |

TABLE 32

$S_{10}$

| Lens No. | Number Of Inflection Points (In Effective Radius) | $A_{s10}$ (mm) | $S_{s10}$ (mm) | $A_{s10}/S_{s10}$ | Effective Radius (mm) |
|---|---|---|---|---|---|
| 1 | 1 | 1.687 | −4.161 | −0.405 | 36.63 |
| 2 | 1 | 2.318 | −4.542 | −0.510 | 36.91 |
| 3 | 1 | 2.214 | −4.484 | −0.494 | 36.82 |
| 4 | 1 | 2.179 | −4.586 | −0.475 | 36.95 |
| 5 | 1 | 1.831 | −4.583 | −0.400 | 37.03 |
| 6 | 1 | 2.064 | −4.627 | −0.446 | 36.87 |
| 7 | 1 | 2.157 | −4.578 | −0.471 | 36.79 |
| 8 | 1 | 2.102 | −4.636 | −0.453 | 36.87 |
| 9 | 1 | 1.957 | −4.336 | −0.451 | 36.82 |
| 10 | 1 | 1.831 | −4.463 | −0.410 | 36.84 |
| 11 | 1 | 1.106 | −4.477 | −0.247 | 36.76 |
| 12 | 1 | 2.165 | −4.389 | −0.493 | 36.84 |
| 13 | 1 | 2.028 | −4.308 | −0.471 | 36.74 |
| 14 | 1 | 1.743 | −4.152 | −0.420 | 36.62 |
| 15 | 1 | 2.072 | −4.343 | −0.477 | 36.70 |
| 16 | 1 | 2.162 | −4.360 | −0.496 | 36.72 |
| 17 | 1 | 1.948 | −4.132 | −0.471 | 36.74 |
| 18 | 1 | 1.251 | −4.316 | −0.290 | 36.29 |
| 19 | 1 | 2.234 | −4.055 | −0.551 | 37.04 |
| 20 | 1 | 0.117 | −4.564 | −0.026 | 35.56 |

TABLE 33

$S_{11}$

| Lens No. | Number Of Inflection Points (In Effective Radius) | $A_{s11}$ (mm) | $S_{s11}$ (mm) | $A_{s11}/S_{s11}$ | Effective Radius (mm) |
|---|---|---|---|---|---|
| 1 | 1 | −20.021 | −19.884 | 1.007 | 37.81 |
| 2 | 1 | −19.840 | −20.050 | 0.990 | 38.06 |
| 3 | 1 | −19.821 | −19.887 | 0.997 | 38.00 |
| 4 | 1 | −19.858 | −19.640 | 1.011 | 37.97 |
| 5 | 1 | −19.744 | −19.530 | 1.011 | 38.05 |
| 6 | 1 | −19.671 | −19.459 | 1.011 | 38.09 |
| 7 | 1 | −19.614 | −19.365 | 1.013 | 38.13 |
| 8 | 1 | −19.752 | −19.556 | 1.010 | 38.04 |
| 9 | 1 | −19.894 | −19.650 | 1.012 | 37.95 |
| 10 | 1 | −19.981 | −19.947 | 1.002 | 37.90 |
| 11 | 1 | −20.159 | −20.100 | 1.003 | 37.78 |
| 12 | 1 | −19.817 | −19.622 | 1.010 | 37.95 |
| 13 | 1 | −19.866 | −19.663 | 1.010 | 37.92 |
| 14 | 1 | −19.983 | −19.856 | 1.006 | 37.85 |
| 15 | 1 | −19.872 | −19.907 | 0.998 | 37.86 |
| 16 | 1 | −19.829 | −19.883 | 0.997 | 37.88 |
| 17 | 1 | −20.095 | −20.660 | 0.973 | 37.94 |
| 18 | 1 | −19.754 | −19.557 | 1.010 | 37.35 |
| 19 | 1 | −20.562 | −22.237 | 0.925 | 38.51 |
| 20 | 1 | −18.718 | −17.580 | 1.065 | 36.25 |

As is shown in Table 28, for the lens groups that constitute the projection lens apparatus, as shown in Tables 25 to 33, the relation in expression 8 below is established for the aspherical ratio $A_{sn}/S_{sn}$, such that two or more inflection points are present in the effective radius of the second lens group incidence surface $S_4$ and that the aspherical level is indicated.

$$0.23 \leq A_{S1}/S_{S1} \leq 0.33$$

$$0.66 \leq A_{S2}/S_{S2} \leq 0.89$$

$$-1.30 \leq A_{S3}/S_{S3} \leq -1.17$$

$$-0.02 \leq A_{S4}/S_{S4} \leq -0.01$$

$$1.31 \leq A_{S7}/S_{S7} \leq 4.03$$

$$28.28 \leq A_{S8}/S_{S8} \leq 67.77$$

$$-0.36 \leq A_{S9}/S_{S9} \leq 5.68$$

$$-0.55 \leq A_{S10}/S_{S10} \leq -0.03$$

$$0.93 \leq A_{S11}/S_{S11} \leq 1.07 \quad \text{(Expression 8)}$$

According to the above described arrangement, a satisfactory aberration correction capability can be obtained using the aspherical plastic lenses that accept the aberration correction role of the projection lens apparatus.

In the above description, PMMA (a refractive index of 1.49, an Abbe number of 58) is employed as the material of the aspherical plastic lens having a refractive index of 1.5 or less and an Abbe number of 57 or greater. However, the material is not limited to this, and any conforming material can be employed. In addition to PMMA, CR-39 (a refractive index of 1.50, an Abbe number of 58) or TPX (a refractive index of 1.466, an Abbe number of 61), for example, can be employed.

As is described above, according to the present invention, the following operation effects can be obtained. The fourth group lens (the aberration correction lens that is arranged following the power lens on the image generation source side) has a meniscus concave shape toward the screen. Further, the lens surface $S_7$ of the fourth group lens 4 on the screen side has an aspherical shape so that the curvature is gradually increased from the light axis to a predetermined point located between the light axis and the outer edge, and is gradually reduced from the predetermined point to the outer edge. Therefore, the assembly process is easily performed while the third group lens 3 and the fourth group lens 4 do not physically interfere with each other in the center portion, including at the light axis, and in the peripheral portion, including at the outer edge. Furthermore, an inexpensive low refractive index material (e.g., the PMMA material) is employed as the base material for the fourth group lens 4, and in order to prevent an accompanying reduction in the refractive index, the refracting power is assigned to the fifth group lens, that is the aspherical plastic lens located nearer the image generation source. Thus, an effective cost reduction can be provided. Further, since the low refractive index material used for this invention has superior flowability, it is easy to form the above described aspherical shapes, and to obtain the shape for performing the appropriate aberration correction. Therefore, as is described above, since the distance relative to the third group lens 3, which is the power lens, can be maintained, and since physical interference between the third group lens 3 and the fourth group lens 4 when these lenses are assembled in the lens barrel can be avoided, the productivity can be increased.

In addition, the relationship between the distance between the image display surface of the image generation source and the emittance plane of the sixth group lens 6 and the focal distances of the lens elements is maintained and is well balanced. Therefore, the intensity of the reflected light for each unit volume can be reduced, and a high contrast can be obtained.

As is described above, when the projection lens apparatus of the invention is employed, an image can be obtained with low distortion, with high contrast, at a superior focus and a large angle of view, and a compact rear projection image display apparatus can be provided. And since the six-group and six-lens structure, as in the conventional arrangement, is employed by using inexpensive glass lenses and plastic lenses and without any deterioration in the focusing performance, a cost reduction is also achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection lens apparatus comprising:
a plurality of lenses, for enlarging and projecting, onto a screen, an original image displayed on an image generation source;
wherein the plurality of lenses are arranged, beginning with the lens nearest the screen, as
(a) a first lens group, including a meniscus lens that has a positive refracting power and has a center convex portion directed toward a screen;
(b) a second lens group, including a lens that has a positive refracting power and has a center convex lens surface directed toward the image generation source side;
(c) a third lens group, including a power lens having a highest positive refracting power;
(d) a fourth lens group, including one meniscus lens that has a positive refracting power and has a concave lens surface directed toward the screen;
(e) a fifth lens group, including a lens that has a positive refracting power and has a center convex lens surface directed toward the image generation source; and
(f) a sixth lens group, including a lens that has a concave lens surface directed toward the screen and has a negative refracting power;
wherein the concave lens surface of the meniscus lens included in the fourth group lens has a curvature in the vicinity of an outer portion of the concave lens surface that is smaller than a curvature in a predetermined area of the concave lens surface defined between a light axis of the concave lens surface of the meniscus lens and the smaller curvature of the concave lens surface in the vicinity of the outer portion of the concave lens surface.

2. A projection lens apparatus according to claim 1, wherein the power lens included in the third lens group is formed of glass; and wherein a plastic material having an Abbe number (vd) equal to or greater than 57 and a refractive index (nd) equal to or lower than 1.500 is employed for the first, the second, the fourth, the fifth and the sixth lens groups other than the power lens.

3. A projection lens apparatus according to claim 1, wherein, for a negative lens included in the fourth lens group, the following relation is established between an aspherical space $A_8$ (a spherical space $S_{S8}$/aspherical space $A_{S8}$) of a lens surface on the image generation source and an inter-plane distance $L_{34}$ between the third group lens and the fourth group lens:

$$5.31 < A_8/L_{34} < 12.57.$$

4. A projection lens apparatus according to claim 1, wherein, when d denotes a distance between an emittance plane of the image generation source and an emittance plane of the sixth lens group, and $f_6$ denotes a focal distance for the sixth lens group, the following relation is established:

$$-7.62 < f_6/d < -5.86.$$

5. A projection lens apparatus according to claim 1, wherein the following relation is present between the lens plane distance $L_{12}$ between the first lens group and the second lens group and the lens plane distance $L_{23}$ between the second lens group and the third lens group:

$$0.22 < (L_{23}/L_{12}) < 0.37.$$

6. A projection lens apparatus according to claim 1, wherein the focal distance of the first lens group is $f_1$, the focal distance of the second lens group is $f_2$, the focal distance of the third lens group is $f_3$, the focal distance of the fourth lens group is $f_4$, the focal distance of the fifth lens group is $f_5$, the focal distance of the sixth lens group $f_6$, and the focal distance of the entire projection lens apparatus is $f_0$, the following relation is established:

$$0.29 < f_0/f_1 < 0.33;$$

$$0.00 < f_0/f_2 < 0.01;$$

$$0.81 < f_0/f_3 < 0.83;$$

$$-0.09 < f_0/f_4 < -0.04;$$

$$0.25 < f_0/f_5 < 0.30; \text{ and}$$

$$-0.70 < f_0/f_6 < -0.64.$$

7. A projection lens apparatus according to claim 6, wherein a wavelength selection filter function is provided for, at the least, either the sixth group lens element or the coolant, or for both of the two.

8. A projection lens apparatus according to claim 1, wherein, when $A_{31}$ is the aspherical space relative to the spherical space $S_{S1}$ of the lens surface of the first lens group near the screen, $A_{S2}$ is the aspherical space relative to the spherical space $S_{S2}$ of the lens surface of the first lens group near the image generation source, $A_{S3}$ is the aspherical space relative to the spherical space $S_{S3}$ of the lens surface of the second lens group near the screen, $A_{S4}$ is the aspherical space relative to the spherical space $S_{S4}$ of the lens surface of the second lens group near the image generation source, $A_{S7}$ is the aspherical space relative to the spherical space $S_{S7}$ of the lens surface of the fourth lens group near the screen, $A_{S8}$ is the aspherical space relative to the spherical space $S_{S8}$ of the lens surface of the fourth lens group near the image generation source, $A_{S9}$ is the aspherical space relative to the spherical space $S_{S9}$ of the lens surface of the fifth lens group near the screen, $A_{S10}$ is the aspherical space relative to the spherical space $S_{S10}$ of the lens surface of the fifth lens group near the image generation source, and $A_{S11}$ is the aspherical space relative to the spherical space $S_{S11}$ of the lens surface of the sixth lens group near the screen, the following relation is established:

$0.23 \leq A_{S1}/S_{S1} \leq 0.33$;

$0.66 \leq A_{S2}/S_{S2} \leq 0.89$;

$-1.30 \leq A_{S3}/S_{S3} \leq -1.17$;

$-0.02 \leq A_{S4}/S_{S4} \leq -0.01$;

$1.31 \leq A_{S7}/S_{S7} \leq 4.03$;

$28.28 \leq A_{S8}/S_{S8} \leq 67.77$;

$-0.36 \leq A_{S9}/S_{S9} \leq 5.68$;

$-0.55 \leq A_{S10}/S_{S10} \leq -0.03$; and $0.93 \leq A_{S11}/S_{S11} \leq 1.07$.

9. A projection lens apparatus according to claim 1, wherein two or more inflection points are present on the lens surface of the second lens group near the image generation source.

10. A projection lens apparatus according to claim 1, wherein a material having an Abbe number (vd) 60 or higher and a refractive index (nd) of 1.600 or lower is employed for the power lens included in the third lens group.

11. A projection lens apparatus according to claim 1, wherein a projection tube is employed as the image generation source; wherein the sixth lens group includes a lens having a negative refracting power and having a concave lens surface directed toward a screen, a coolant for cooling the projection tube and a fluorescent plane glass for the projection tube; wherein the center of a curvature of the fluorescent plane glass is present near the screen.

12. A rear projection apparatus image display apparatus comprising:
a screen;
an image generation source; and
a projection lens apparatus, including
a plurality of lenses, for enlarging and projecting, onto a screen, an original image displayed on an image generation source;
wherein the plurality of lenses are arranged, beginning with the lens nearest the screen, as
(a) a first lens group, including a meniscus lens that has a positive refracting power and has a center convex portion directed toward a screen;
(b) a second lens group, including a lens that has a positive refracting power and has a center convex lens surface directed toward the image generation source side;
(c) a third lens group, including a power lens having a highest positive refracting power;
(d) a fourth lens group, including one meniscus lens that has a positive refracting power and has a concave lens surface directed toward the screen;
(e) a fifth lens group, including a lens that has a positive retracting power and has a center convex lens surface directed toward the image generation source; and
(f) a sixth lens group, including a lens that has a concave lens surface directed toward the screen and has a negative retracting power;
wherein the concave lens surface of the meniscus lens included in the fourth group lens has a curvature in the vicinity of an outer portion of the concave lens surface that is smaller than a curvature in a predetermined area of the concave lens surface defined between a light axis of the concave lens surface of the meniscus lens and the smaller curvature of the concave lens surface in the vicinity of the outer portion of the concave lens surface.

13. A rear projection image display apparatus according to claim 12, wherein the following relation is present between a distance L (mm) from the lens surface of a lens of the first lens group located close to the screen and the screen and an effective diagonal length M (inches) of the rear projection screen:

$17.0 < (L/M) < 17.4$.

* * * * *